(12) United States Patent
Okada

(10) Patent No.: US 12,236,143 B2
(45) Date of Patent: Feb. 25, 2025

(54) INFORMATION PROCESSING APPARATUS ENABLING PROPER USE ACCORDING TO ACTUAL INSTALLATION LOCATION, INFORMATION PROCESSING SYSTEM, METHOD OF CONTROLLING INFORMATION PROCESSING APPARATUS, METHOD OF CONTROLLING INFORMATION PROCESSING SYSTEM, AND STORAGE MEDIUM

(71) Applicant: CANON KABUSHIKI KAISHA, Tokyo (JP)

(72) Inventor: Hideyuki Okada, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/320,475

(22) Filed: May 19, 2023

(65) Prior Publication Data
US 2023/0384998 A1  Nov. 30, 2023

(30) Foreign Application Priority Data
May 25, 2022  (JP) .................................. 2022-085377

(51) Int. Cl.
*G06F 3/12* (2006.01)
*G06K 15/00* (2006.01)
*G06K 15/02* (2006.01)

(52) U.S. Cl.
CPC .......... *G06F 3/1238* (2013.01); *G06F 3/1222* (2013.01); *G06K 15/40* (2013.01)

(58) Field of Classification Search
None
See application file for complete search history.

(56) References Cited

U.S. PATENT DOCUMENTS

| | | | |
|---|---|---|---|
| 5,752,128 A * | 5/1998 | Yamashita | ............. G03G 21/02 399/80 |
| 2005/0039044 A1* | 2/2005 | Gassho | ................. G06F 3/1222 726/4 |
| 2008/0148265 A1 | 6/2008 | Nakajima | |

(Continued)

FOREIGN PATENT DOCUMENTS

| | | | | |
|---|---|---|---|---|
| CN | 1613050 | * | 5/2005 | ........... G06F 3/1222 |
| CN | 102026327 | * | 4/2011 | ............. H04W 36/32 |

(Continued)

*Primary Examiner* — Beniyam Menberu
(74) *Attorney, Agent, or Firm* — ROSSI, KIMMS & McDOWELL LLP

(57) ABSTRACT

An information processing apparatus that makes it possible to properly use the apparatus according to an actual installation location of the apparatus. A multifunction peripheral as the apparatus includes an installation location information controller configured to acquire installation location information of the multifunction peripheral that performs information processing, and a controller configured to determine whether or not to restrict at least part of functions of the multifunction peripheral based on a result of comparison performed by a controller of an authentication server, which configured to compare position information stored in advance and the installation location information acquired by the installation location information controller when a predetermined time elapses.

11 Claims, 17 Drawing Sheets

(56) References Cited

U.S. PATENT DOCUMENTS

2011/0063670 A1\* 3/2011 Ito .......................... G06F 3/1204
358/1.15
2017/0187890 A1\* 6/2017 Han .................. H04N 1/00037

FOREIGN PATENT DOCUMENTS

| JP | 2004299298 | \* | 10/2004 | ............. B41J 29/38 |
| JP | 2004299367 | \* | 10/2004 | ................ B41J 5/30 |
| JP | 2005017990 | \* | 1/2005 | ............. B41J 29/00 |
| JP | 2005243041 | \* | 9/2005 | ............. G06F 3/12 |
| JP | 2008152534 A | | 7/2008 | |
| JP | 2011065264 | \* | 3/2011 | ............. G06F 21/31 |
| JP | 2011113241 | \* | 6/2011 | ............. G06F 21/60 |
| JP | 6963140 | \* | 11/2021 | ............. G06Q 40/00 |

\* cited by examiner

*FIG. 7A*

| LOGIN ID | ROLE |
|---|---|
| ID-A | ADMINISTRATOR |
| ID-B | GENERAL USER |
| ID-C | GENERAL USER |
| ID-D | GENERAL USER |
| ID-E | GENERAL USER |

FIG. 7B

| DEVICE S/N | INSTALLATION LOCATION | NW ADDRESS | POSITION INFORMATION | LATEST UPDATED DATE & TIME |
|---|---|---|---|---|
| MFP 1001 | ZZ OFFICE | x.x.x.x/21 | aaa.bbb | 2019/4/10-13:00 |
| MFP 1002 | YY HOME | y.y.y.y/24 | ccc.ddd | 2017/9/25-19:30 |

FIG. 7C

| DEVICE S/N | INSTALLATION LOCATION | NW ADDRESS | POSITION INFORMATION | LATEST UPDATED DATE & TIME |
|---|---|---|---|---|
| MFP 1001 | ZZ OFFICE | x.x.x.x/21 | aaa.bbb | 2019/4/10-13:00 |
| MFP 1002 | YY HOME | y.y.y.y/24 | ccc.ddd | 2017/9/25-19:30 |
| MFP 1000 | OFFICE A | z.z.z.z/20 | eee.fff | 2020/4/25-11:00 |

INFORMATION PROCESSING APPARATUS ENABLING PROPER USE ACCORDING TO ACTUAL INSTALLATION LOCATION, INFORMATION PROCESSING SYSTEM, METHOD OF CONTROLLING INFORMATION PROCESSING APPARATUS, METHOD OF CONTROLLING INFORMATION PROCESSING SYSTEM, AND STORAGE MEDIUM

BACKGROUND OF THE INVENTION

Field of the Invention

The present invention relates to an information processing apparatus, an information processing system, a method of controlling the image processing apparatus, a method of controlling the information processing system, and a storage medium.

Description of the Related Art

In recent years, a society has changed such that flexible working styles are possible regardless of a time, a place or the like, and for example, the use of a telework or a cloud has more and more advanced. Therefore, for example, a place and a scene where printing is performed using a printer have been diversified. On the other hand, there is a concern on a risk of information leakage depending on a place or scene where printing is performed using a printer. Further, an office environment that protects information using a firewall has been considered as a secure environment, but circumstances have changed such that leakage of information via workers can be a problem. Therefore, based on an ethical doctrine that human nature is fundamentally evil, there is an idea of a security model of zero-trust (nothing is trusted) that there is a risk of information leakage regardless of a use environment of a printer and whether or not a firewall is provided. In the zero-trust security model, each of a plurality of devises and systems has a mechanism of firm personal authentication and access control, and it is important that a user permitted to use the printer based on a result of the authentication is enabled to access only permitted information in a permitted place. Therefore, when performing printing using a printer, it is important that a user permitted to use the printer is enabled to perform the printing only by using the printer installed in a place where the use of the printer is permitted.

Japanese Laid-Open Patent Publication (Kokai) No. 2008-152534 discloses a system in which information (installation location information) on a location where a printer has been installed is registered in advance in a management server that manages printers, and the registered information is used for print control. Further, Japanese Laid-Open Patent Publication (Kokai) No. 2008-152534 discloses a system in which alert levels of respective areas where printers are installed are registered in the management server, and each registered alert level is used for determination of whether or not to permit printing when printing is actually performed.

However, in the system described in Japanese Laid-Open Patent Publication (Kokai) No. 2008-152534, the installation location information of the printer, registered in the management server in advance, is used, and hence, for example, in a case where the location of the printer is changed after being registered, a difference is generated between the registered installation location information and the actual installation location information. Examples of the assumed cases are as follows: There is a case where an administrator who is in charge of management of the printer has changed the installation location of the printer and updated the installation location information registered in the printer itself, but has forgotten to update the installation location information for the management server. Further, there is a case where the installation location of the printer has been changed despite the intention of the administrator. In this case, there is a possibility that a malicious user has intentionally changed the place of the printer. In these cases, since the management server performs determination based on the installation location information which has already been registered, and hence there is a fear that the management server permits printing at a location where printing is originally inhibited, and as a result, printing is actually performed. As described above, in the system described in Japanese Laid-Open Patent Publication (Kokai) No. 2008-152534, it is impossible to properly use the printer according to the actual installation location of the printer.

SUMMARY OF THE INVENTION

The present invention provides an information processing apparatus that makes it possible to properly use the information processing apparatus according to an actual installation location of the information processing apparatus, an information processing system, a method of controlling the information processing apparatus, a method of controlling the information processing system, and a storage medium.

In a first aspect of the present invention, there is provided an information processing apparatus that performs information processing, including an information acquisition unit configured to acquire installation location information of an installation location of the information processing apparatus, and a determination unit configured to determine whether or not to perform restriction of at least part of functions of the information processing apparatus, based on a result of comparison performed by a comparison unit configured to compare, when a predetermined time period elapses, between position information stored in advance and the installation location information acquired by the information acquisition unit.

In a second aspect of the present invention, there is provided an information processing system including a server and at least one information processing apparatus that is capable of communicating with the server, wherein the information processing apparatus includes an information acquisition unit configured to acquire installation location information of an installation location of the information processing apparatus, and a determination unit configured to determine whether or not to perform restriction of at least part of functions of the information processing apparatus, based on a result of comparison performed by a comparison unit configured to compare, when a predetermined time period elapses, between position information stored in the server in advance and the installation location information acquired by the information acquisition unit.

According to the present invention, it is possible to properly use the information processing apparatus according to an actual installation location of the information processing apparatus.

Further features of the present invention will become apparent from the following description of exemplary embodiments (with reference to the attached drawings).

BRIEF DESCRIPTION OF THE DRAWINGS

FIGS. 7A to 7C are diagrams showing respective examples of databases for authentication, which are used in the processes performed by the information processing system.

DESCRIPTION OF THE EMBODIMENTS

The present invention will now be described in detail below with reference to the accompanying drawings showing embodiments thereof. However, configurations of embodiments described below are given only by way of example, and are by no means intended to limit the scope of the present invention. For example, components as elements of the present invention can be replaced by desired components that can exhibit the same functions. Further, desired components may be added.

Figure 1:
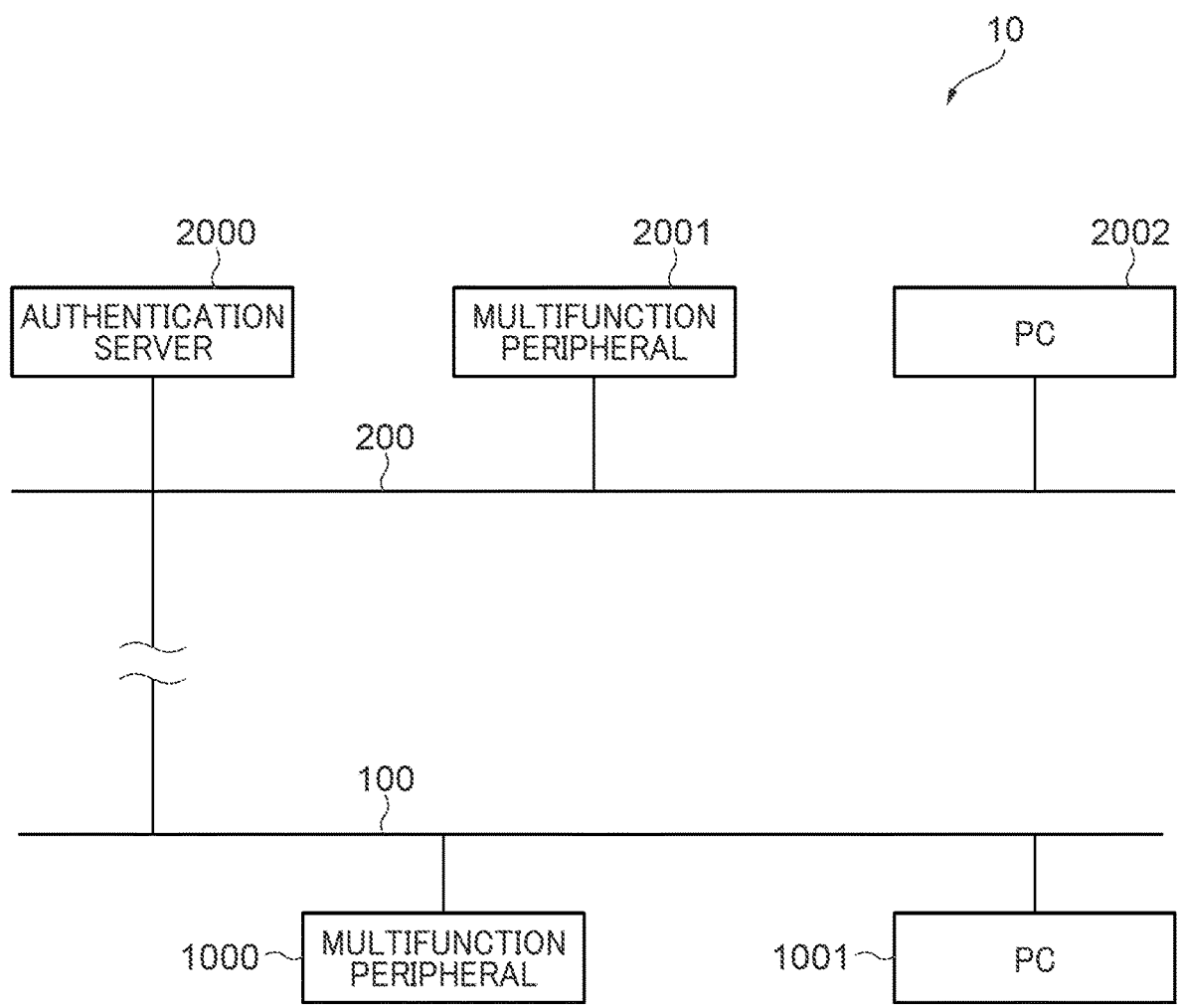
FIG. 1 is a block diagram showing the whole configuration of an information processing system.

FIG. 1 is a block diagram showing the whole configuration of an information processing system. As shown in FIG. 1, the information processing system, denoted by reference numeral 10, includes a multifunction peripheral 1000, a personal computer (PC) 1001, an authentication server (server) 2000, a multifunction peripheral 2001, and a personal computer (PC) 2002. Note that in the information processing system 10, the multifunction peripheral 2001 and the PC 2002 may be omitted. Further, the information processing system 10 may further include a multifunction peripheral or multifunction peripherals in addition to the multifunction peripheral 1000 and the multifunction peripheral 2001. Thus, the information processing system 10 is configured to include at least one multifunction peripheral.

The multifunction peripheral 1000 is an information processing apparatus that performs information processing and, in the present embodiment, has a print function. That is, the multifunction peripheral 1000 is an image forming apparatus that forms an image on a recording sheet by printing. Further, the multifunction peripheral 1000 is a digital multifunction peripheral that has a user authentication function (personal authentication function). The multifunction peripheral 1000 is communicably connected to the PC 1001 via an internal network 100. With this, it is possible to transmit and receive a variety of data, such as print data, scan data, and management information of the multifunction peripheral 1000, between the multifunction peripheral 1000 and the PC 1001. Further, the multifunction peripheral 1000 is communicably connected to the authentication server 2000 via the internal network 100 and an external network 200. Further, to the external network 200, the multifunction peripheral 2001 and the PC 2002 are connected. With this, in the information processing system 10, the multifunction peripheral 1000, the PC 1001, the authentication server 2000, the multifunction peripheral 2001, and the PC 2002 are enabled to communicate with one another. Although in the present embodiment, the internal network 100 is a local network in a sharing space, such as a co-working space, and the external network 200 is a public network which can be directly accessed from the Internet, this is not limitative.

Figure 2A:
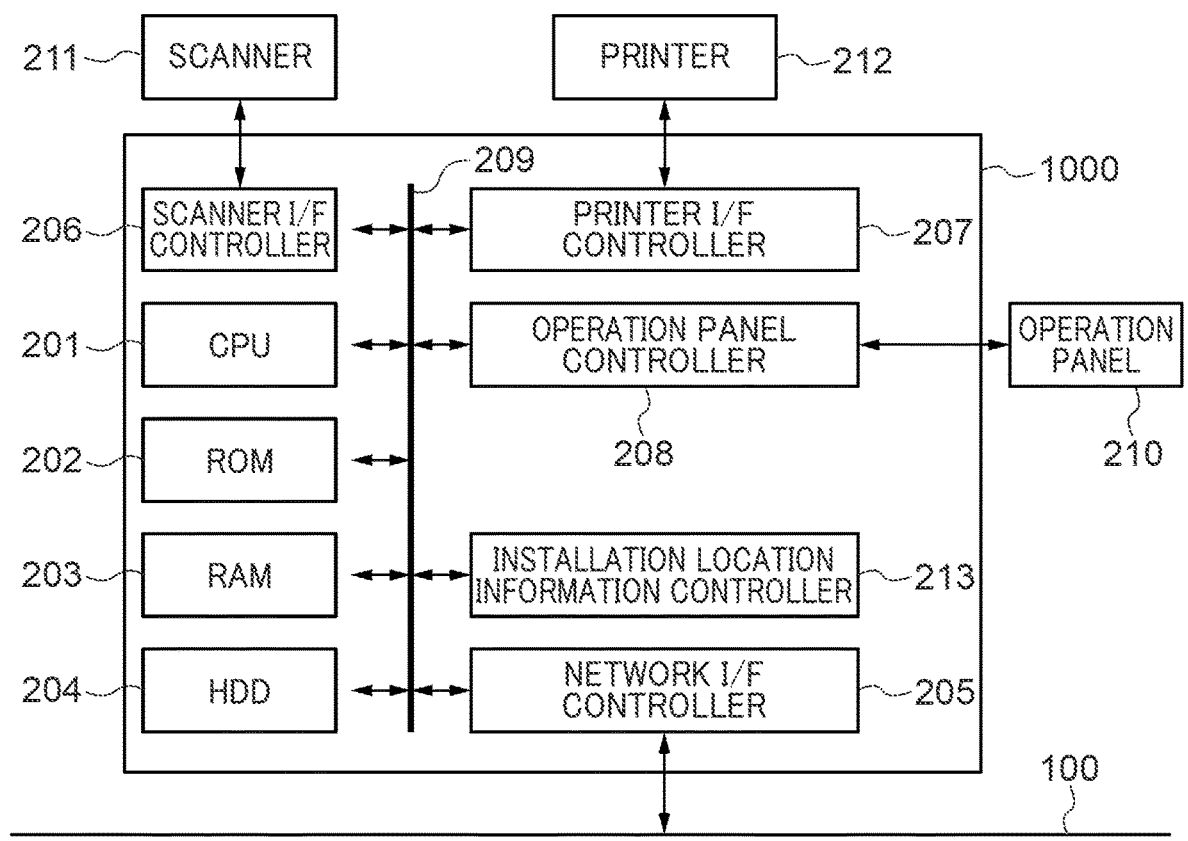
FIGS. 2A and 2B are block diagrams showing hardware configurations of a multifunction peripheral and an authentication server, respectively, included in the information processing system.
Figure 2B:
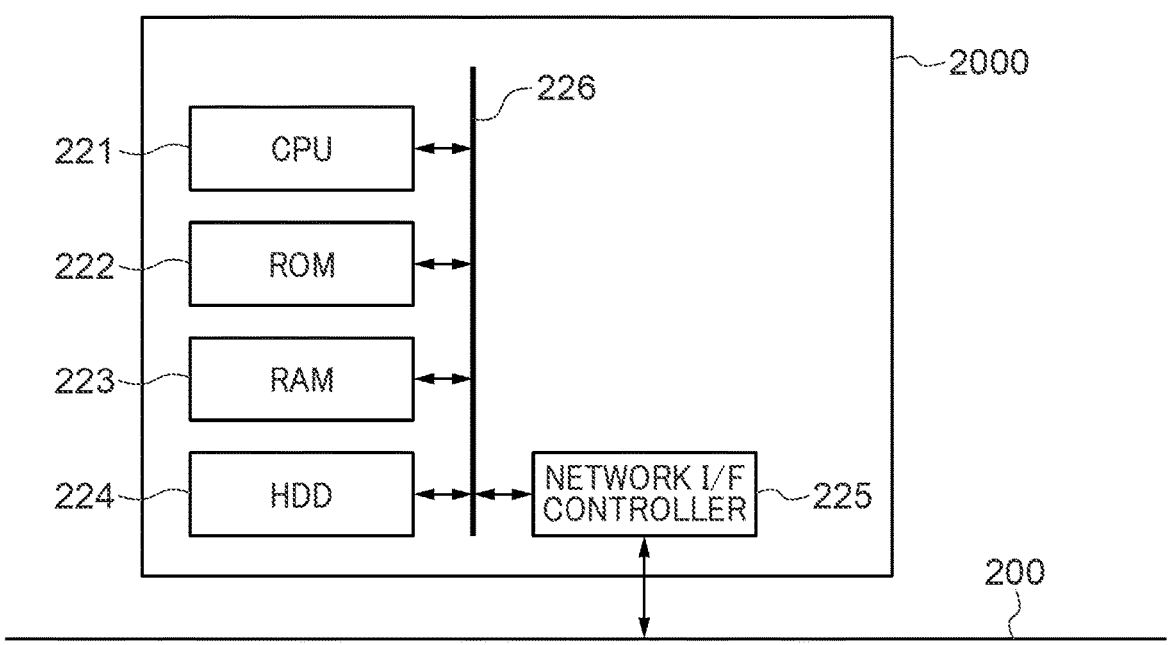

FIGS. 2A and 2B are block diagrams showing hardware configurations of the multifunction peripheral and the authentication server, respectively, included in the information processing system. FIG. 2A is a block diagram showing the hardware configuration of the multifunction peripheral 1000. Note that the multifunction peripheral 2001 has the same hardware configuration as that of the multifunction peripheral 1000. FIG. 2B is a block diagram showing the hardware configuration of the authentication server 2000. As shown in FIG. 2A, the multifunction peripheral 1000 includes a CPU 201, a ROM 202, a RAM 203, and an HDD 204. Further, the multifunction peripheral 1000 includes a network interface (I/F) controller 205, a scanner interface controller 206, a printer interface controller 207, an operation panel controller 208, a bus 209, an operation panel 210, a scanner 211, a printer 212, and an installation location information controller 213.

The CPU 201 executes software programs of the multifunction peripheral 1000 and controls the overall operation of the multifunction peripheral 1000. The software programs include e.g. programs for the CPU 201 to cause means and sections of the multifunction peripheral 1000 to operate according to a method of controlling the information processing apparatus and a method of controlling the information processing system. ROM is an abbreviation of read only memory, and the ROM 202 stores a boot program, fixed parameters of the multifunction peripheral 1000, and so forth. RAM is an abbreviation of random access memory, and the RAM 203 is used e.g. for having programs loaded therein and temporarily storing data, when the CPU 201 performs control. HDD is an abbreviation of hard disk drive, and the HDD 204 stores system software, applications, and a variety of data. The CPU 201 executes the boot program stored in the ROM 202, and also executes programs stored in the HDD 204 by loading them into the RAM 203. With this, the operation of the multifunction peripheral 1000 is controlled. The network interface controller 205 controls transmission and reception of a variety of data to and from the internal network 100. The scanner interface controller 206 controls reading of an original, which is performed by the scanner 211. The printer interface controller 207 controls print processing and the like, which are performed by the printer 212. The operation panel controller 208 controls the operation panel 210, thereby controlling display of a variety of information thereon and input of an instruction from a user who uses the multifunction peripheral 1000. Note that the operation panel 201 is implemented by e.g. an operation panel of a touch panel type.

The installation location information controller 213 is an information acquisition unit configured to acquire installation location information of an installation location of the multifunction peripheral 1000, i.e. a use place thereof. The installation location information has no particularly limited form, but may be, for example, a character string representing an installation location set to the multifunction peripheral 1000 in advance such that the character string is selectable, the longitude and latitude, or the like. Note that the installation location information controller 213 may be configured to be capable of communicating with a sensor (GPS sensor) which can measure the longitude and latitude. In this case, the longitude-and-latitude information acquired from the sensor can be acquired by the installation location information controller 213 as the installation location information.

The bus 209 connects the CPU 201, the ROM 202, the RAM 203, the HDD 204, the network interface controller 205, the scanner interface controller 206, the printer interface controller 207, the operation panel controller 208, and the installation location information controller 213 such that these components are communicable with one another. This makes it possible to transmit control signals from the CPU 201, and transmit and receive a variety of data signals and the like between the components.

As shown in FIG. 2B, the authentication server 2000 includes a CPU 221, a ROM 222, a RAM 223, an HDD 224, a network interface controller 225, and a bus 226. The CPU 221 executes software programs of the authentication server 2000 and controls the overall operation of the authentication server 2000. The ROM 222 stores a boot program and fixed parameters of the authentication server 2000. The RAM 223 is used e.g. for having programs loaded therein and temporarily storing data, when the CPU 221 performs control. The HDD 224 stores system software, applications, and a variety of data. The CPU 221 executes the boot program stored in the ROM 222, and executes programs stored in the HDD 224 by loading them into the RAM 223. With this, the operation of the authentication server 2000 is controlled. Note that in the information processing system 10, the program for causing the CPU 201 to execute the method of controlling the information processing system 10 may be distributedly stored in the multifunction peripheral 1000 and the authentication server 2000. The network interface controller 225 controls transmission and reception of data to and from the external network 200. Further, the authentication server 2000 provides a user interface for receiving a dialog message and an operation instruction, for an information device connected to the external network 200 via the network interface controller 225. In the present embodiment, this user interface is referred to as the "remote user interface". The bus 226 connects the CPU 221, the ROM 222, the RAM 223, the HDD 224, and the network interface controller 225 such that these components are communicable with one another. This makes it possible to transmit control signals from the CPU 201, and transmit and receive a variety of data signals and the like between the components.

Figure 3A:
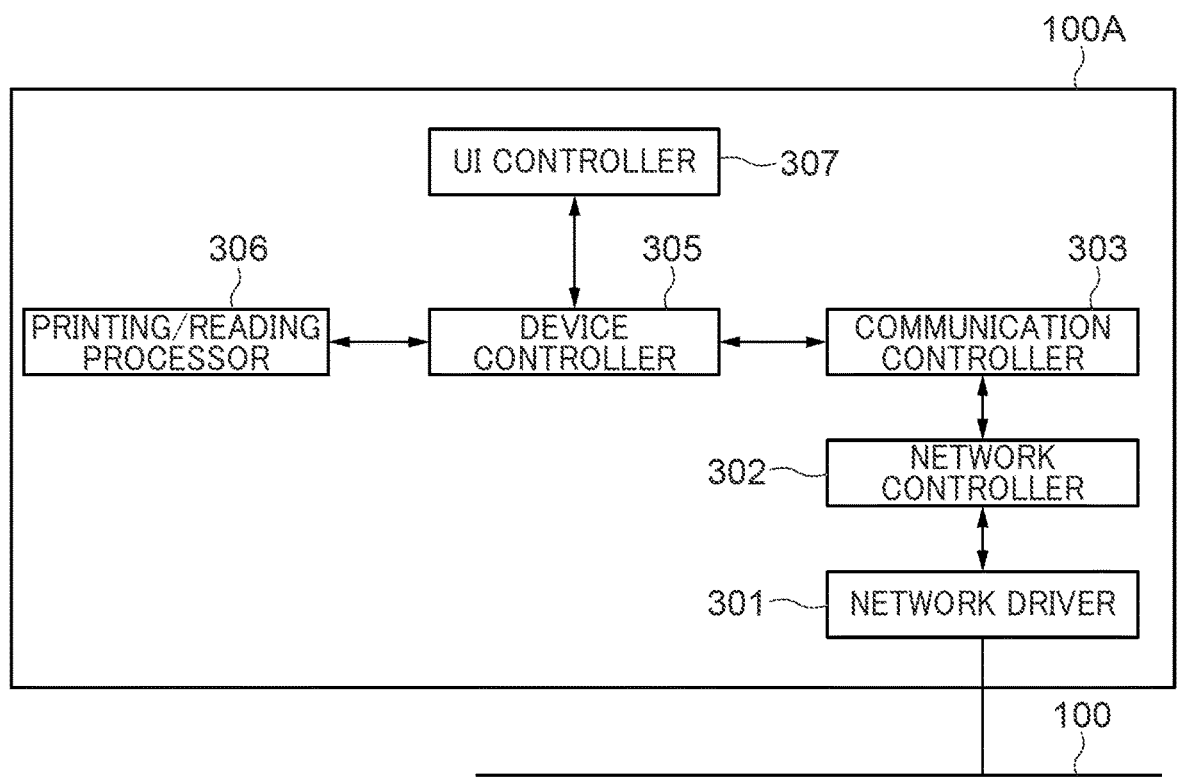
FIGS. 3A and 3B are block diagrams showing software modules (software components) of the multifunction peripheral and the authentication server, respectively, included in the information processing system.
Figure 3B:
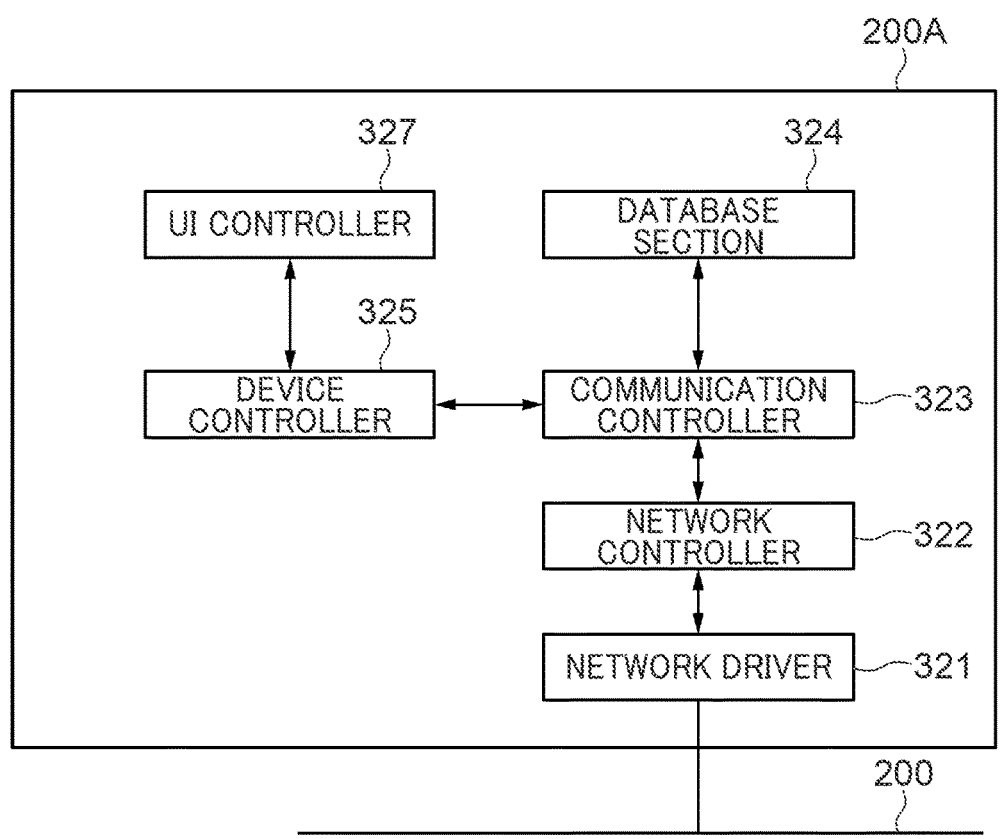

FIGS. 3A and 3B are block diagrams showing software modules (software components) of the multifunction peripheral and the authentication server, respectively, included in the information processing system. FIG. 3A is a block diagram showing the software modules of the multifunction peripheral 1000. The software modules shown in FIG. 3A are each realized by the CPU 201 that executes programs loaded into the RAM 203. Note that the multifunction peripheral 2001 has the same software modules as those of the multifunction peripheral 1000. FIG. 3B is a block diagram showing the software modules of the authentication server 2000. The software modules shown in FIG. 3B are each realized by the CPU 221 that executes programs loaded into the RAM 223.

The multifunction peripheral 1000 has a controller 100A as the software modules shown in FIG. 3A. The controller 100A is realized by the CPU 201, the ROM 202, the RAM 203, the HDD 204, and so forth of the multifunction peripheral 1000. The controller 100A includes a network driver 301, a network controller 302, a communication controller 303, a device controller 305, a printing/reading processor 306, and a user interface (UI) controller 307. The network driver 301 controls the network interface controller 205 connected to the internal network 100 to transmit and receive a variety of data to and from the outside via the internal network 100. The network controller 302 controls communication in a transport layer and lower layers than the transport layer of a network communication protocol, such as TCP/IP, to transmit and receive a variety of data. The communication controller 303 is a module for controlling a plurality of communication protocols supported by the multifunction peripheral 1000. Encrypted communication, such as TLS, supported by the multifunction peripheral 1000 is also performed by the communication controller 303. The device controller 305 is a module for performing centralized control of the multifunction peripheral 1000 by generating control commands and control data for the multifunction peripheral 1000. User authentication is instructed from the operation panel 210 via the operation panel controller 208, the installation location information controller 213, and the network interface controller 205. The user authentication is comprehensively performed by the device controller 305. The printing/reading processor 306 is a module for executing a print function of the printer 212 and an original reading function of the scanner 211. In the present embodiment, an instruction to the multifunction peripheral 1000 for executing scanning or printing can also be given by a user via the operation panel 210. The control of the operation panel 210 and the operation panel controller 208 is performed by the user interface controller 307.

The authentication server 2000 has a controller 200A as the software modules shown in FIG. 3B. The controller 200A is realized by the CPU 221, the ROM 222, the RAM 223, the HDD 224, and so forth of the authentication server 2000. The controller 200A includes a network driver 321, a network controller 322, a communication controller 323, a database section 324, a device controller 325, and a user interface controller 327. The network driver 321 controls the network interface controller 225 connected to the external network 200 to transmit and receive a variety of data to and from the outside via the external network 200. The network controller 322 controls communication in a transport layer and layers lower than the transport layer of a network communication protocol, such as TCP/IP, to transmit and receive data. The communication controller 323 is a module for controlling a plurality of communication protocols supported by the authentication server 2000. Encrypted communication, such as TLS, supported by the authentication server 2000 is also performed by the communication controller 323. The database section 324 is a module for performing processing for creating/deleting a variety of databases stored in the HDD 224 and the like processing, and processing for consulting/editing the contents of each database based on transaction and the like processing. The device controller 325 is a module for performing centralized control of the authentication server 2000 by generating control commands and control data for the authentication server 2000. Further, in the present embodiment, an operation on the authentication server 2000 is performed via a remote user interface which can be accessed from information equipment typified by the PC 2002, via the network interface controller 225. The control of this remote user interface is performed by the user interface controller 327.

Figure 4:
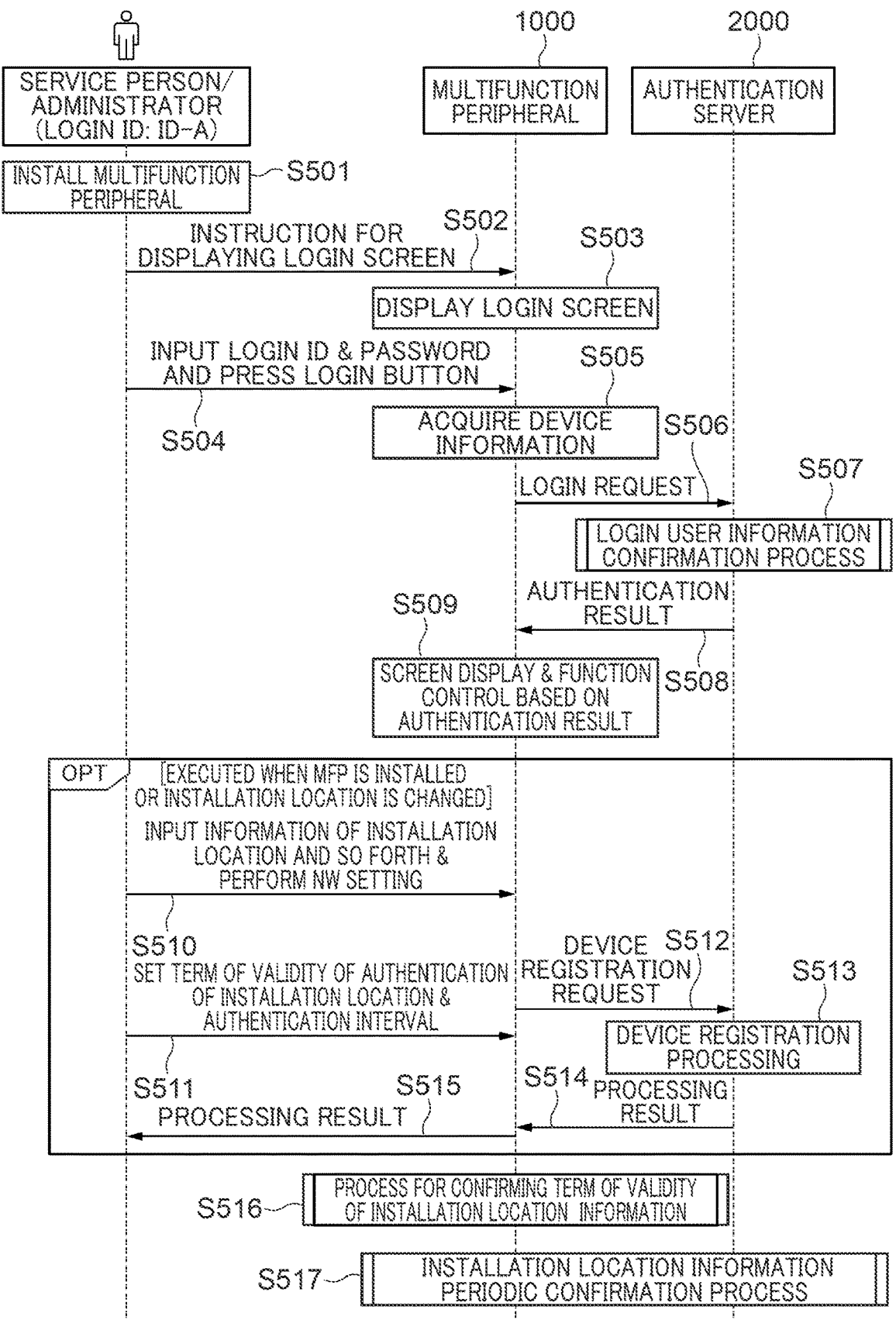
FIG. 4 is a sequence diagram schematically showing processes performed by the information processing system.
Figure 5:
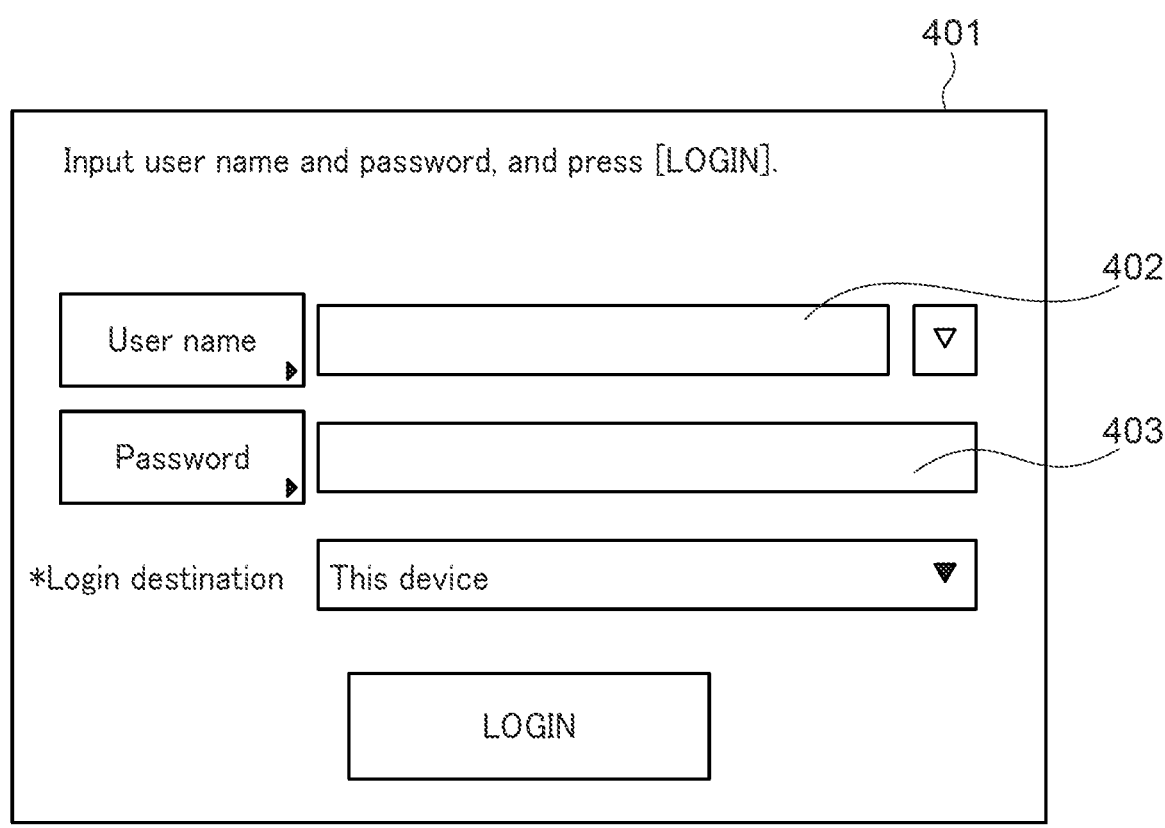
FIG. 5 is a diagram of a login screen of the multifunction peripheral.

FIG. 4 is a sequence diagram schematically showing processes performed by the information processing system. FIG. 5 is a diagram of a login screen of the multifunction peripheral.

As shown in FIG. 4, in a step S501, a service person who performs regular maintenance and the like of the multifunction peripheral 1000 or an administrator who performs management and the like of the multifunction peripheral 1000 (hereinafter represented by the "administrator") performs installation of the multifunction peripheral 1000. Here, a login ID of the administrator is "ID-A".

In a step S502, to log into the multifunction peripheral 1000, first, the administrator instructs the multifunction peripheral 1000 to display the login screen, denoted by reference numeral 401, shown in FIG. 5.

In a step S503, upon receipt of the instruction in the step S502, the multifunction peripheral 1000 operates such that the operation panel controller 208 causes the login screen 401 to be displayed on the operation panel 210. As shown in FIG. 5, the login screen 401 includes an input box 402 to which a login ID (user name) is input, an input box 403 to which a password is input, and a LOGIN button 404 for executing login.

In a step S504, the administrator inputs the login ID in the input box 402 and a password in the input box 403, and the presses the LOGIN button 404, thereby performing a request for login to the multifunction peripheral 1000.

In a step S505, upon receipt of the request for login in the step S504, the multifunction peripheral 1000 acquires device information of the multifunction peripheral 1000 itself. The device information is not particularly limited, and in the present embodiment, examples of the device information include a serial number (S/N) uniquely assigned to the multifunction peripheral 1000, first installation location information (installation location) of the multifunction peripheral 1000, second installation location information (position information) of the multifunction peripheral 1000, and a network (NW) address. The serial number is stored in the ROM 202 in advance and can be read out by the CPU 201 via the bus 209. The first installation location information is information input by the administrator to the operation panel 210, received by the user interface controller 307 via the operation panel controller 208, and stored in the HDD 204. Further, the CPU 201 can read out the first installation location information from the HDD 204 via the bus 209 and use the read information for the control of the multifunction peripheral 1000. The second installation location information is acquired by the installation location information controller 213 and is stored in the HDD 204 or loaded into the RAM 203. The second installation location information can be read out by the CPU 201 via the bus 209. The network address is determined by the network controller 302 based on information input by the administrator to the operation panel 210 or received by the network interface controller 205 via the internal network 100. Further, the network address can be read out by the CPU 201 via the bus 209.

In a step S506, the multifunction peripheral 1000 transmits the login ID input in the step S504 and the device information acquired in the step S505 to the authentication server 2000 as a login request. Note that the communication from the multifunction peripheral 1000 to the authentication server 2000 is performed, on the side of the multifunction peripheral 1000, by the network interface controller 205 via the internal network 100. Further, on the side of the authentication server 2000, the communication is performed by the network interface controller 225 via the external network 200.

Figure 6:
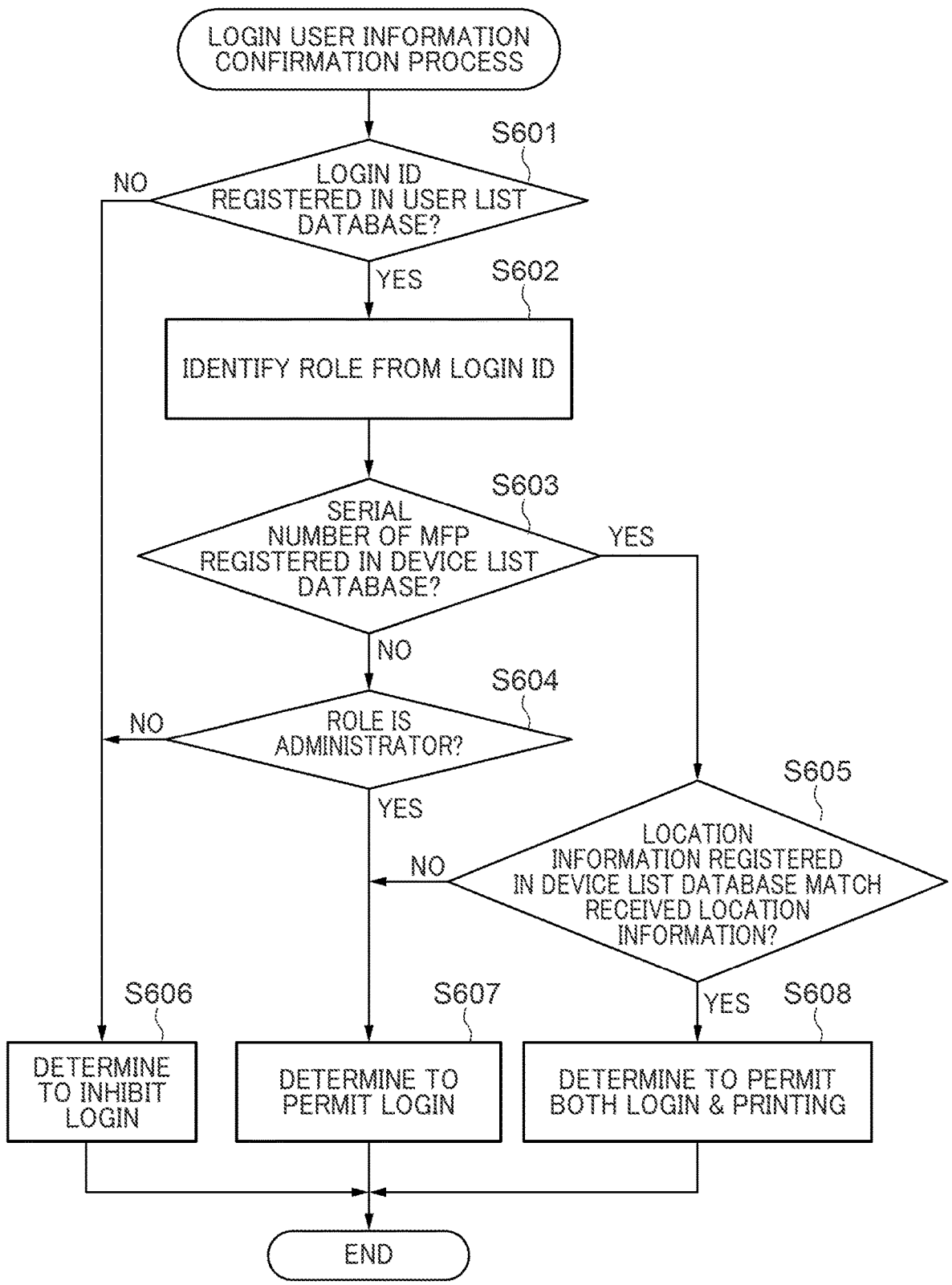
FIG. 6 is a flowchart of a login user information confirmation process.

In a step S507, upon receipt of the login request in the step S506, the authentication server 2000 performs a login user information confirmation process. The login user information confirmation process in the step S507 will be described with reference to FIGS. 6 and 7A to 7C. FIG. 6 is a flowchart of the login user information confirmation process. FIGS. 7A to 7C are diagrams showing respective examples of databases for authentication, which are used in the processes performed by the information processing system.

Referring to FIG. 6, in a step S601, the controller 200A of the authentication server 2000 determines whether or not the login ID in the device information received from the multifunction peripheral 1000 in the step S507 is registered in a user list database 701 shown in FIG. 7A. The user list database 701 includes an item 705 of login ID and an item 706 of role, i.e. administrator or general user. This makes it possible to determine the role of each user having a login ID registered in the user list database 701. If it is determined in the step S601 that the login ID received from the multifunction peripheral 1000 in the step S507 is not registered in the user list database 701, the process proceeds to a step S606. In the step S606, the controller 200A determines to inhibit the login, followed by terminating the present process. On the other hand, if it is determined in the step S601 that the login ID received from the multifunction peripheral 1000 in the step S507 is registered in the user list database 701, the process proceeds to a step S602.

In the step S602, the controller 200A identifies the role of the user having the login ID based on the user list database 701.

In a step S603, the controller 200A determines whether or not the serial number in the device information received from the multifunction peripheral 1000 in the step S507 is registered in a device list database 702 shown in FIG. 7B. The device list database 702 includes an item 707 of device serial number (S/N), an item 708 of first installation location information (installation location), an item 709 of network address, an item 710 of second installation location information (position information), and an item 711 of latest update date and time. The device serial number is a code formed by a predetermined number of digits, which is assigned as a unique number to a multifunction peripheral and is used to identify the multifunction peripheral. Then, based on the device list database 702, it is possible to determine a location where each multifunction peripheral registered and managed by the device serial number is installed and position information set for the installed multifunction peripheral. If it is determined in the step S603 that the serial number received from the multifunction peripheral 1000 in the step S507 is not registered in the device list database 702, the process proceeds to a step S604. On the other hand, if it is determined in the step S603 that the serial number received from the multifunction peripheral 1000 in the step S507 is registered in the device list database 702, the process proceeds to a step S605.

In the step S604, the controller 200A determines whether or not the role of the user having the login ID and requesting login is an administrator. If it is determined in the step S604 that the role of the user having the login ID and requesting login is not an administrator, the process proceeds to the step S606. On the other hand, if it is determined in the step S604 that the role of the user having the login ID and requesting login is an administrator, the process proceeds to a step S607. In the step S607, the controller 200A determines to permit the login to the multifunction peripheral 1000 and generates a response to the login request received in the step S506, followed by terminating the present process. Note that in this step, the controller 200A performs control to inhibit printing by the administrator after logging into the multifunction peripheral 1000. This is because when a multifunction peripheral is installed, generally, this multifunction peripheral is not yet registered in the device list database 702, but even in this case, judging that an administrator is performing the registration, the controller 200A controls to permit the login requested by the administrator.

Here, login to the multifunction peripheral 1000 performed by an administrator when an installation location of the multifunction peripheral 1000 is changed will be described with reference to the flowchart in FIG. 6. As described above, if it is determined in the step S603 that the serial number is registered in the device list database 702, the process proceeds to the step S605. In the step S605, the controller 200A determines whether or not the second installation location information (position information) and the network address of the device information received in the step S507 match the respective corresponding information items of the multifunction peripheral, which are registered in the device list database 702. If it is determined in the step S605 that these information items do not match, the process proceeds to the step S607. In this case, it is considered that the multifunction peripheral is moved by being carried, and hence in the step S607, the controller 200A determines to permit the login and generates a response to the login request received in the step S506. Note that in this step, the controller 200A may perform control to inhibit printing by the administrator after logging into the multifunction peripheral 1000. On the other hand, if it is determined in the step S605 that these information items match, the process proceeds to a step S608. In the step S608, the controller 200A determines to permit both login and printing and generates a response to the login request received in the step S506, followed by terminating the present process. As described above, the login user information confirmation process in the step S507 is performed by the controller 200A.

Referring again to FIG. 4, the description of the processes performed by the information processing system is continued. After execution of the step S507, in a step S508, the controller 200A of the authentication server 2000 transmits the response to the login request received in the step S506, which has been generated by the login user information confirmation process in the step S507 and indicates an authentication result, to the multifunction peripheral 1000.

In a step S509, the controller 100A performs display of a screen and function control based on the authentication result received in the step S508. For example, in a case where a response indicative of permission of printing is transmitted as the response in the step S508, the controller 100A controls the operation panel controller 208 of the multifunction peripheral 1000 to display a print permission home screen 1101 shown in FIG. 8A on the operation panel 210. Here, in the present embodiment, a print job is once temporarily held in the HDD 204 of the multifunction peripheral 1000. Then, when a print function button 1102 on the print permission home screen 1101 is operated (pressed), a list of print jobs is displayed on the operation panel 210. Only a job instructed anew to print from this print job list is printed. On the other hand, in a case where a response indicative of inhibition of printing is transmitted as the response in the step S508, the controller 100A controls the operation panel controller 208 to display a print inhibition home screen 1104 shown in FIG. 8B on the operation panel 210. The print inhibition home screen 1104 is a screen formed by hiding the print function button 1102 from the print permission home screen 1101. Thus, in the step S509, the controller 100A can switch whether or not to permit use of the print function by the logged-in user according to the response received from the authentication server 2000 in the step S508. Further, the processing operations up to the step S509 form a login process performed by the administrator.

As described above, in the multifunction peripheral 1000, the actual (current) installation location information acquired by the installation location information controller 213 and the installation location information stored in the authentication server 2000 in advance are periodically (at predetermined time intervals) compared. Although this comparison is performed by the controller 200A (comparison unit) of the authentication server 2000 in the present embodiment, this is not limitative, but the comparison may be performed by the controller 100A of the multifunction peripheral 1000. Then, whether or not to restrict at least part of the functions of the multifunction peripheral 1000 (restriction of the print function in the present embodiment) is determined based on a result of this comparison. Note that this determination is performed by the controller 100A (determination unit) of the multifunction peripheral 1000. Further, in a case where the actual installation location information acquired by the installation location information controller 213 and the installation location information stored in the authentication server 2000 in advance do not match, it is determined to restrict the function. This makes it possible to properly use the multifunction peripheral 1000 according to the actual installation location of the multifunction peripheral 1000. For example, it is possible to prevent execution of printing at a location where printing is originally desired to be inhibited, and therefore, it is possible to reduce the risk of information leakage and the like. Further, the restricted function is not limited to the print function, but may be the copy function, the scan function, the data storage function, or the like.

Figure 8A:
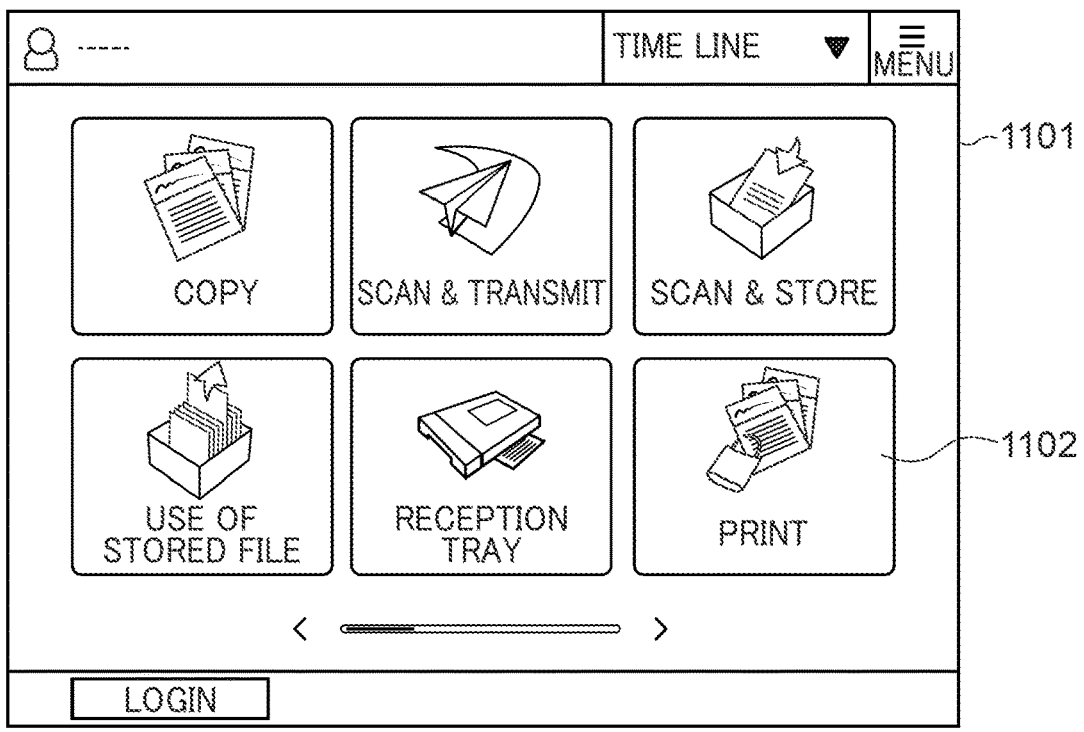
FIGS. 8A and 8B are diagrams each showing an example of a home screen displayed on the multifunction peripheral.
Figure 8B:
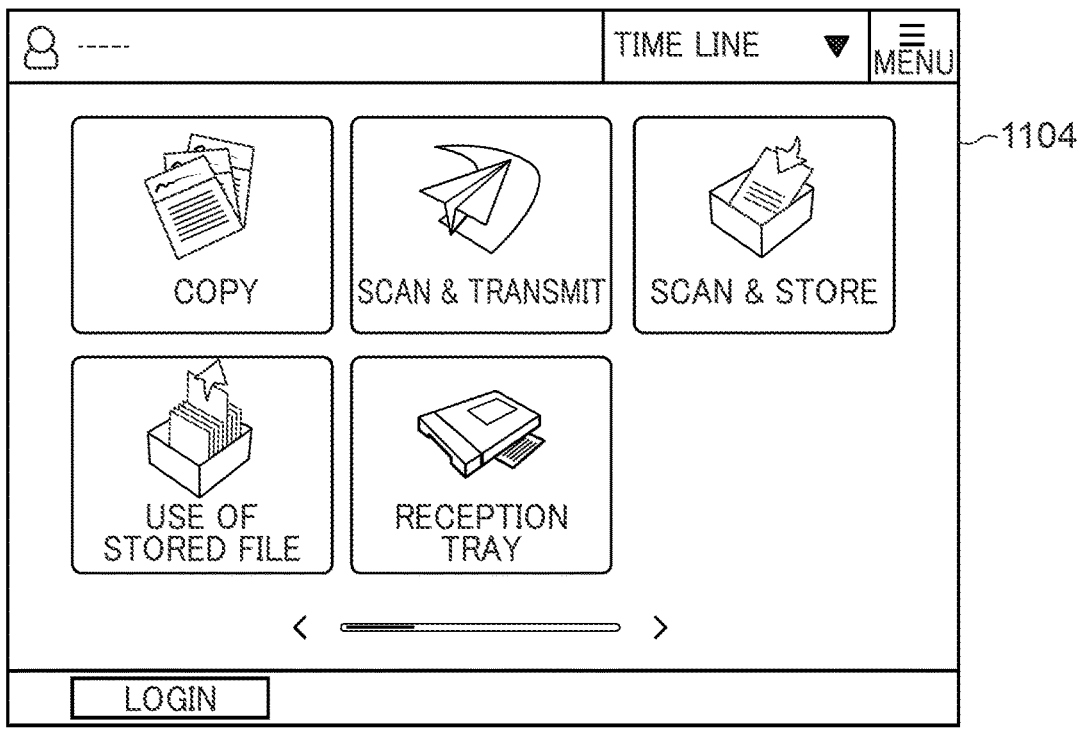

In the multifunction peripheral 1000, the network interface controller 205 functions as a transmission unit configured to transmit the actual installation location information acquired by the installation location information controller 213 to the authentication server 2000, and also functions as a reception unit configured to receive a result of the comparison from the authentication server 2000. Further, as shown in FIGS. 8A and 8B, in a case where it is determined to restrict the print function, it is possible to notify a user of this fact by hiding the print function button 1102 on the operation panel 210. This enables the administrator to grasp that the print function is restricted. Thus, in the present embodiment, the operation panel 210 functions as a notification unit configured to notify a user of function restriction.

In part of the sequence after a step S510, processing differs depending on whether or not the setting of the installation location is performed by the administrator. Here, a case where the setting of the installation location is performed by the administrator will be described. Note that in a case where the setting of the installation location is not performed, the steps S510 to S515 are omitted.

Figure 9:
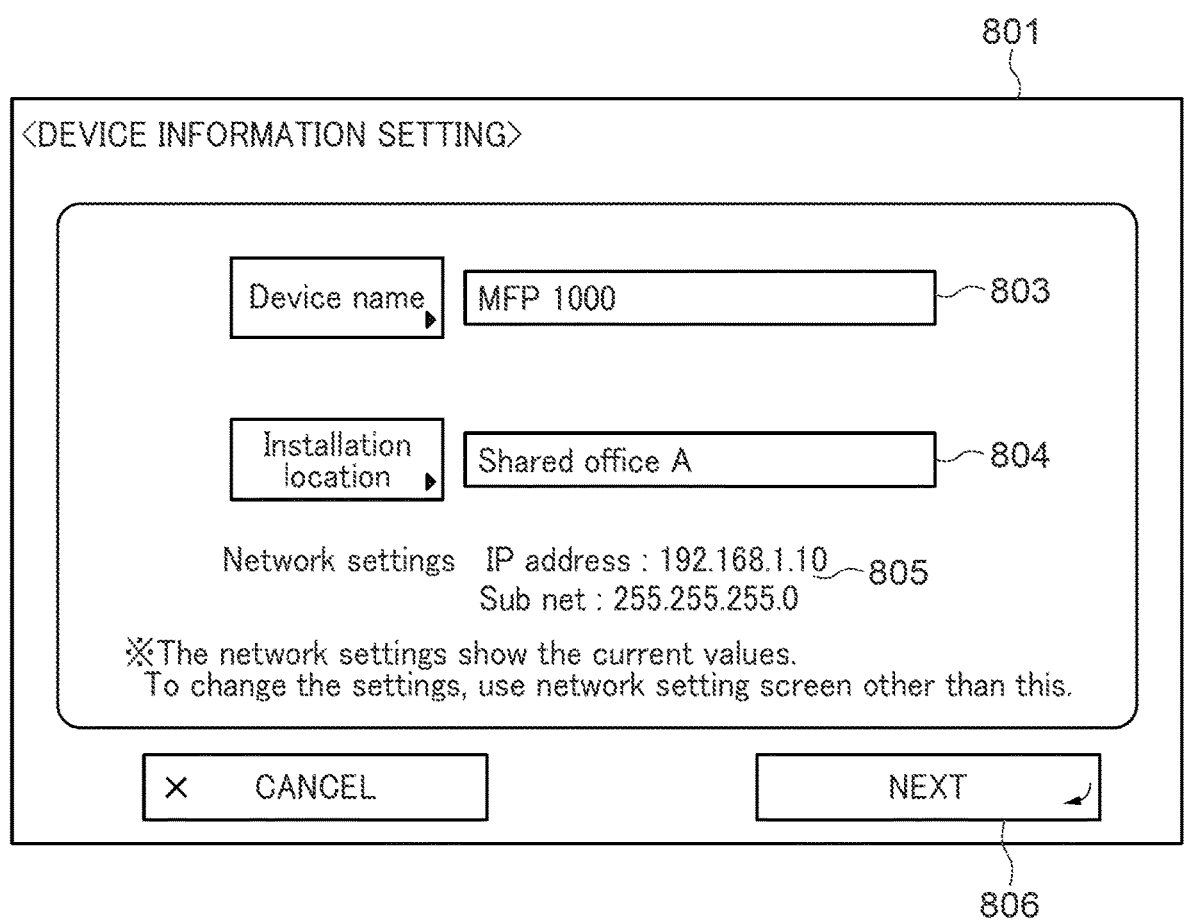
FIG. 9 is a diagram showing an example of a device information-setting screen displayed on the multifunction peripheral.

In the step S510, the administrator performs the setting concerning the name and the installation location of the multifunction peripheral 1000 via a device information-setting screen 801 shown in FIG. 9. Further, the administrator performs not only this setting, but also confirmation of network settings to be registered in the authentication server 2000. The device information-setting screen 801 includes a device name field 803, an installation location field 804, and a network settings display field 805. In the device name field 803, a name of the multifunction peripheral is input. In the installation location field 804, information on an installation location of the multifunction peripheral is input. In the network settings display field 805, the current network settings are displayed. In the present embodiment, the network settings include an IP address of the network and a sub net expressing a network address. Further, the contents of the settings displayed on the device information-setting screen 801 as default values at the time of execution of the setting in the step S510 are the contents stored as the settings of the network interface controller 205. These contents of the settings are acquired by the CPU 206 and displayed on the operation panel 210 via the control panel controller 208. After the administrator inputs desired setting values and then confirms the displayed contents, the administrator can press a next button 806 on the device information-setting screen 801. Thus, in the present embodiment, the device information-setting screen 801 functions as an information setting unit configured to set installation location information, and is configured such that the settings of the current installation location information can be changed. With this, for example, in a case where the administrator moves the multifunction peripheral 1000 by carrying the same, the administrator can change the installation location information of this multifunction peripheral 1000, on an as-needed basis.

Figure 10A:
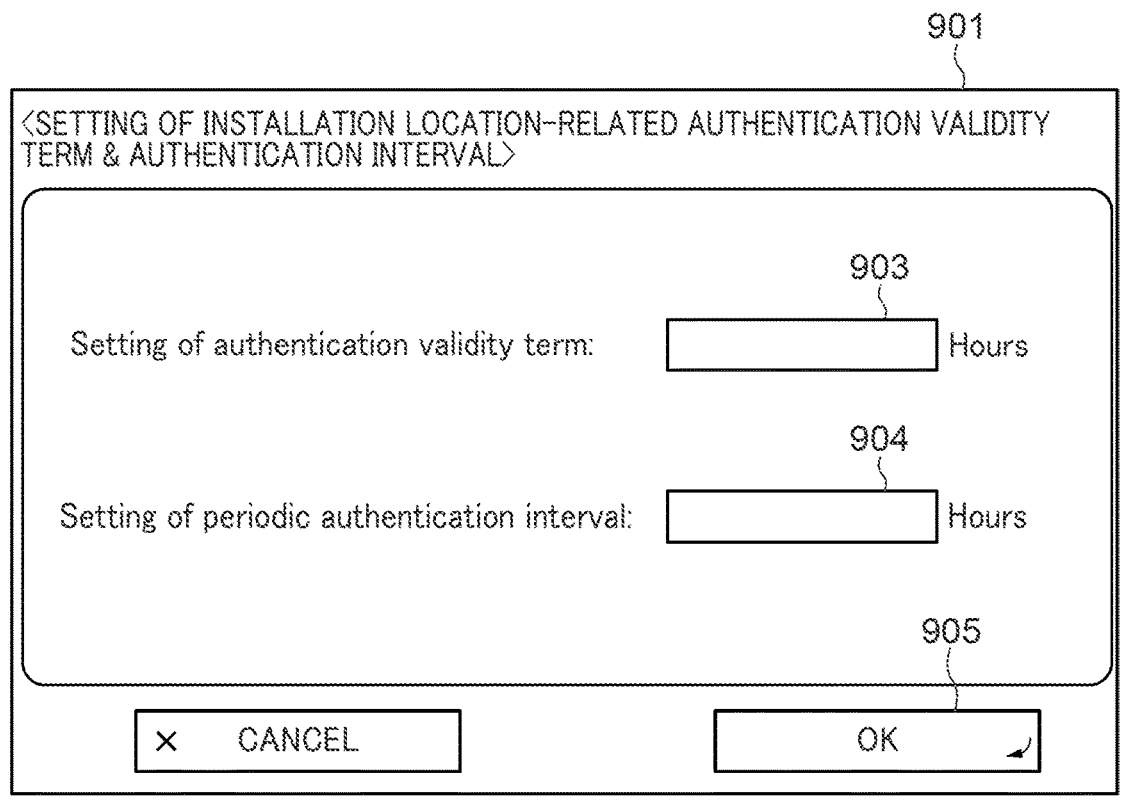
FIGS. 10A and 10B are diagrams each showing an example of a setting screen displayed on the multifunction peripheral for making settings for authentication.

After the next button 806 is pressed, in a step S511, the CPU 206 of the multifunction peripheral 1000 controls the operation panel controller 208 to display a setting screen 901 shown in FIG. 10A on the operation panel 210. The setting screen 901 includes a field 903 and a field 904. The field 903 is indicated by the name of "setting of authentication validity term" displayed therefor. This field 903 is an item for setting the term of validity of the information concerning the installation location, which is set in the step S510, in units of hours. That is, the field 903 functions as a validity term-setting unit configured to set the term of validity of installation location information set on the device information-setting screen 801. This makes it possible to set the term of validity to a desired time limit. Note that the term of validity, set in the field 903, is not limited to the time set in units of hours, but for example, the term of validity may be set in units of days, weeks, or the like. The filed 904 is indicated by the name of "setting of periodic authentication interval" displayed therefor. The field 904 functions as a timing setting unit configured to set an interval (timing) of periodic comparison to be executed between the actual installation location information acquired by the installation location information controller 213 and the installation location information stored in the authentication server 2000 in advance. This makes it possible to set the interval of periodic authentication to a desired interval. Note that the timing set in the field 904 is not limited to a timing set in units of hours, but for example, the timing may be set in units of days, weeks, or the like. When the administrator performs the setting of authentication validity term and the setting of periodic authentication interval on the setting screen 901, and then presses an OK button 905 on the setting screen 901, it is possible to finalize the settings.

After the OK button 905 is pressed, in a step S512, the controller 100A transmits the information which has been set in the step S510, and the information of the serial number of the multifunction peripheral 1000, which has been acquired in the step S505, to the authentication server 2000 as a device registration request. Similar to the login request transmitted in the step S506, the device registration request is transmitted by the network interface controller 205 of the multifunction peripheral 1000 to the authentication server 2000 via the internal network 100.

In a step S513, upon receipt of the device registration request transmitted in the step S512, the controller 200A performs device registration processing. A device list database 703 shown in FIG. 7C is an example showing a state obtained after the device registration processing has been performed in the step S513. As shown in FIG. 7C, the variety of information set in the step S510 is registered in the device list database 703 as a row of the multifunction peripheral 1000.

After the device registration processing is completed in the step S513, in a step S514, the controller 200A transmits a notification that the device registration processing is completed to the multifunction peripheral 1000 as a response.

Figure 10B:
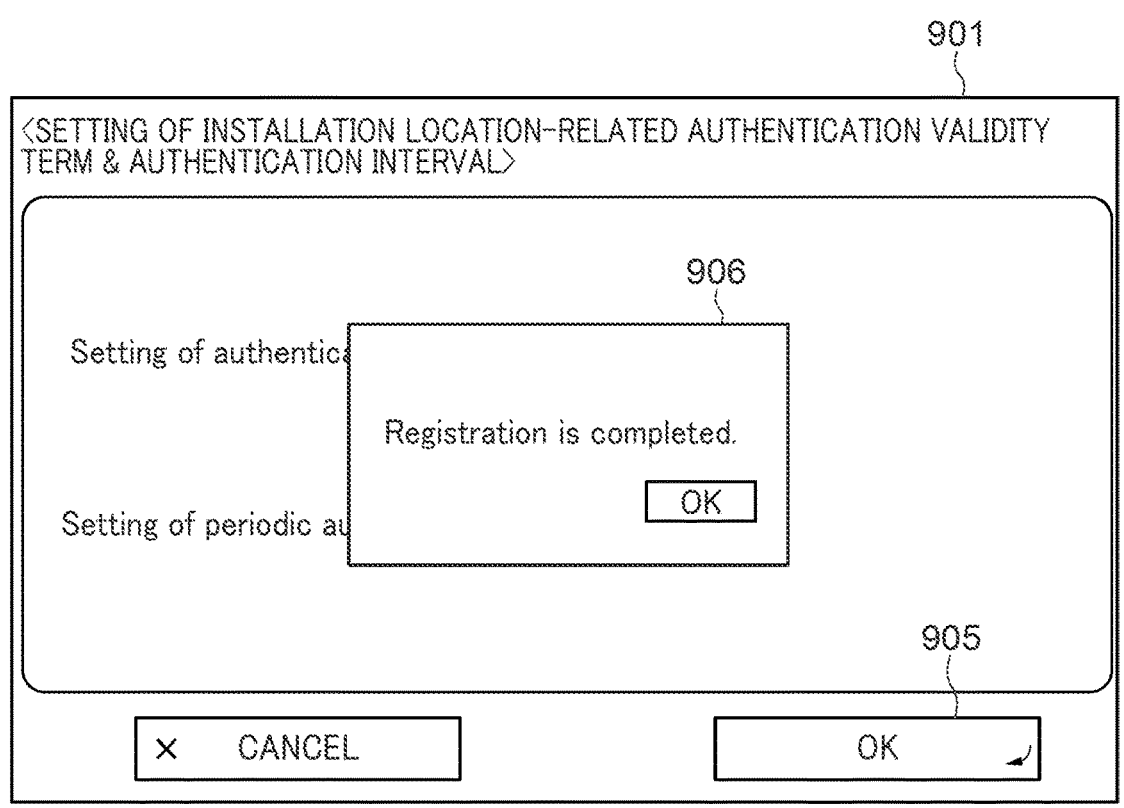

In a step S515, the controller 100A receives the response transmitted in the step S514. Then, the controller 100A displays a pop-up message 906 (see FIG. 10B) indicating that the registration is completed on the device information-setting screen 901 on which the OK button 905 has been pressed in the step S511. With this, completion of the registration is notified to the administrator.

With the processing operations up to the step S515, the process for registering the device in the device list database 703 is completed. Then, in a step S516, the controller 100A performs a process for confirming the term of validity of installation location information, which has been set in the step S511. Further, in a step S517, a process (installation location information periodic confirmation process) for periodically performing confirmation comparison between the installation location information of the multifunction peripheral 1000 and the installation location information registered in the authentication server 2000 is performed. Note that although, in the present embodiment, the installation location information periodic confirmation process in the step S517 is mainly performed by the controller 200A of the authentication server 2000, this is not limitative, but this process may be performed by the controller 100A of the multifunction peripheral 1000 or may be performed by the controller 200A and the controller 100A.

Figure 11:
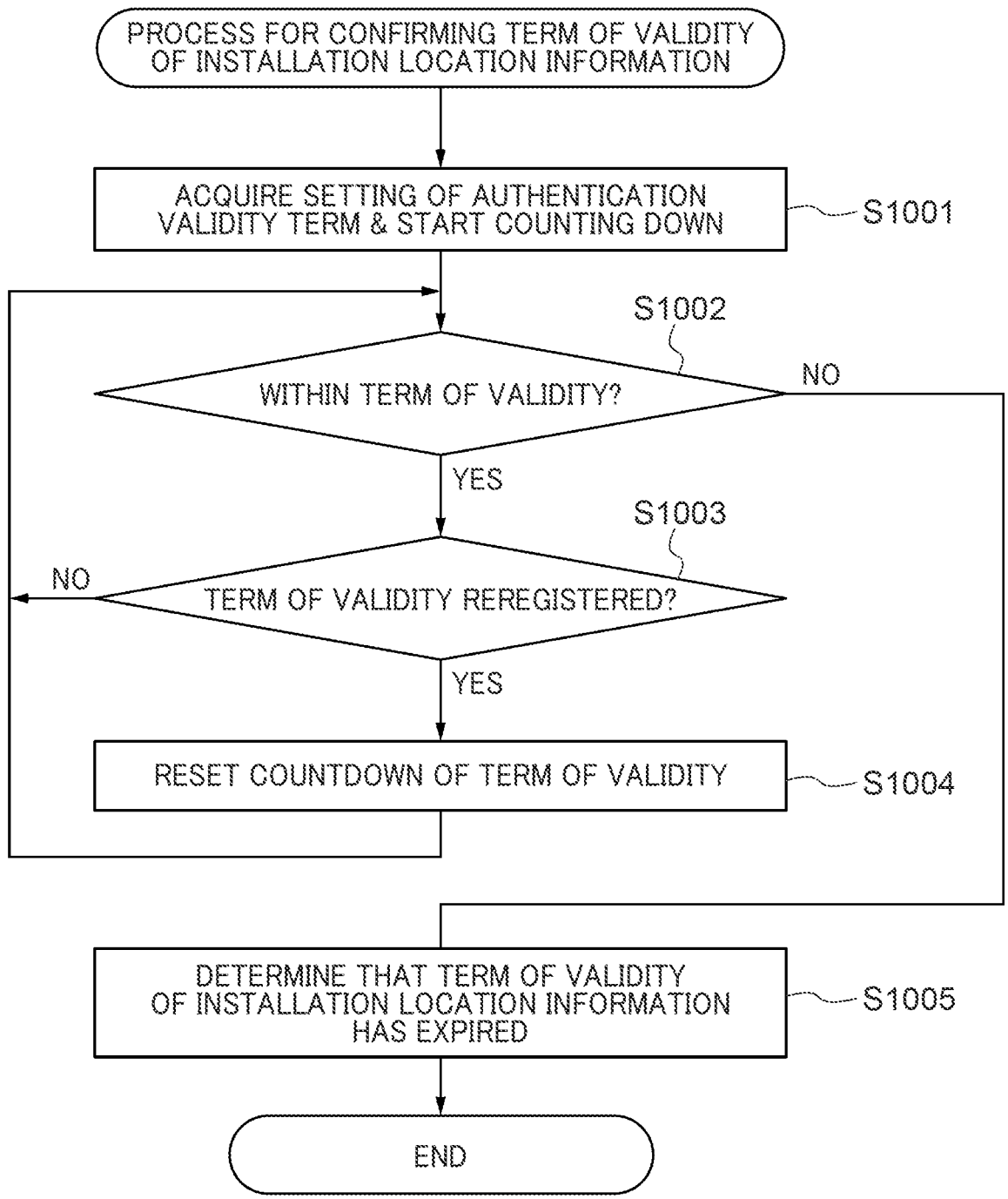
FIG. 11 is a flowchart of a process for confirming a term of validity of installation location information (installation location-related authentication validity term).

The confirmation process in the step S516 will be described with reference to FIG. 11. FIG. 11 is a flowchart of the process for confirming the term of validity of installation location information (installation location-related authentication validity term). Note that after being started in the multifunction peripheral 1000, the confirmation process is performed in parallel and asynchronously with login of a user.

Referring to FIG. 11, in a step S1001, the controller 100A of the multifunction peripheral 1000 acquires the information on a value of the setting of authentication validity term, which is set in the step S511, and starts counting down.

In a step S1002, the controller 100A checks a state of counting down started in the step S1001 and determines whether or not the counted time is still within the authentication validity term (term of validity). If it is determined in the step S1002 that the counted time is still within the authentication validity term, the process proceeds to a step S1003. On the other hand, if it is determined in the step S1002 that the counted time exceeds the authentication validity term, the process proceeds to a step S1005.

In the step S1003, the controller 100A determines whether or not the setting of authentication validity term has been reregistered. If it is determined in the step S1003 that the setting of authentication validity term has been reregistered, the process proceeds to a step S1004. On the other hand, if it is determined in the step S1003 that the setting of authentication validity term has not been reregistered, the process returns to the step S1002, and the step S1002 et seq. are sequentially executed. At this time, the counting down operation is continued without resetting the counted time.

In the step S1004, the controller 100A resets the counting down.

Figure 12A:
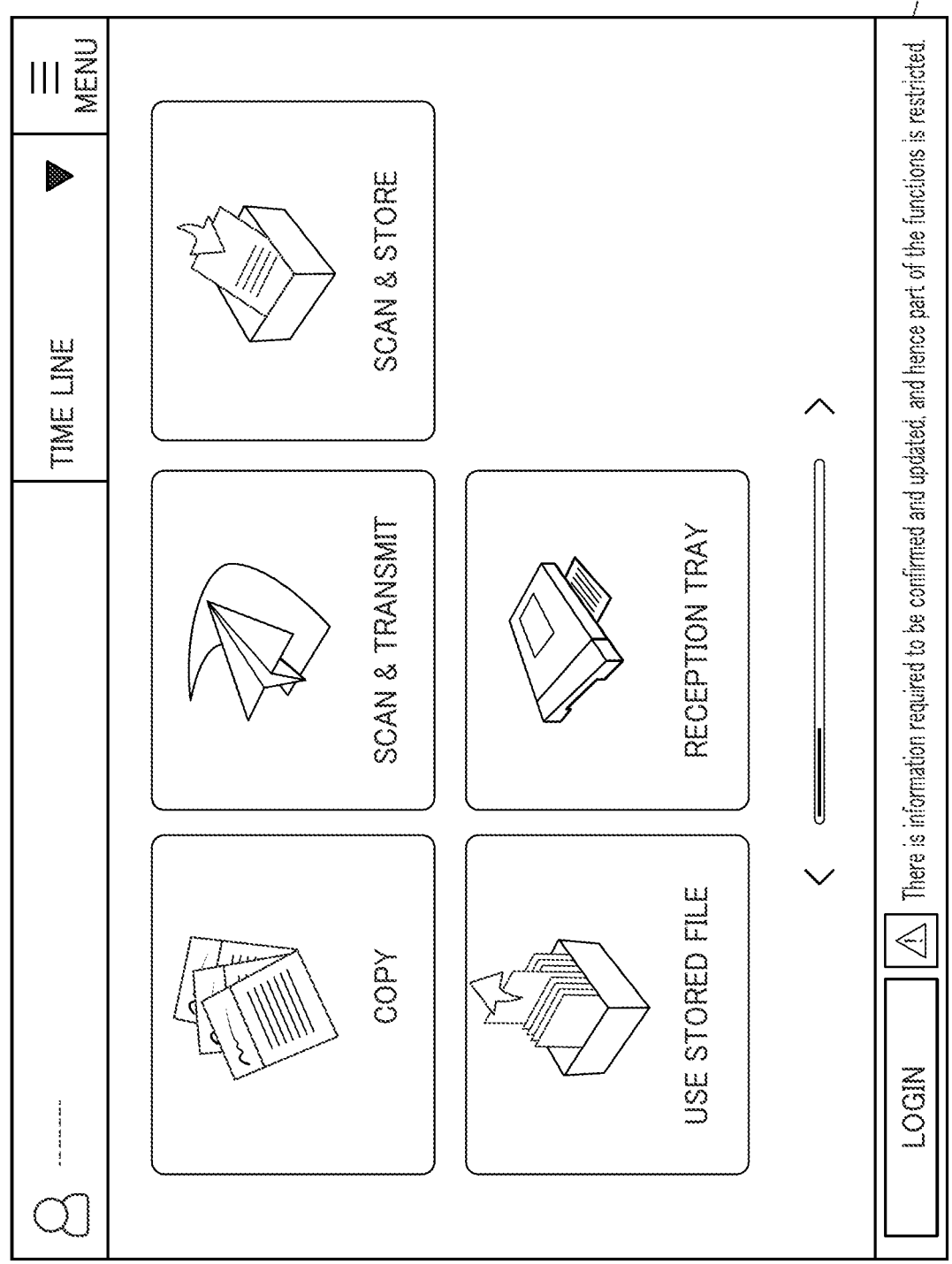
FIGS. 12A to 12C are diagrams each showing an example of the home screen (example of a message) displayed on the multifunction peripheral.
Figure 12B:
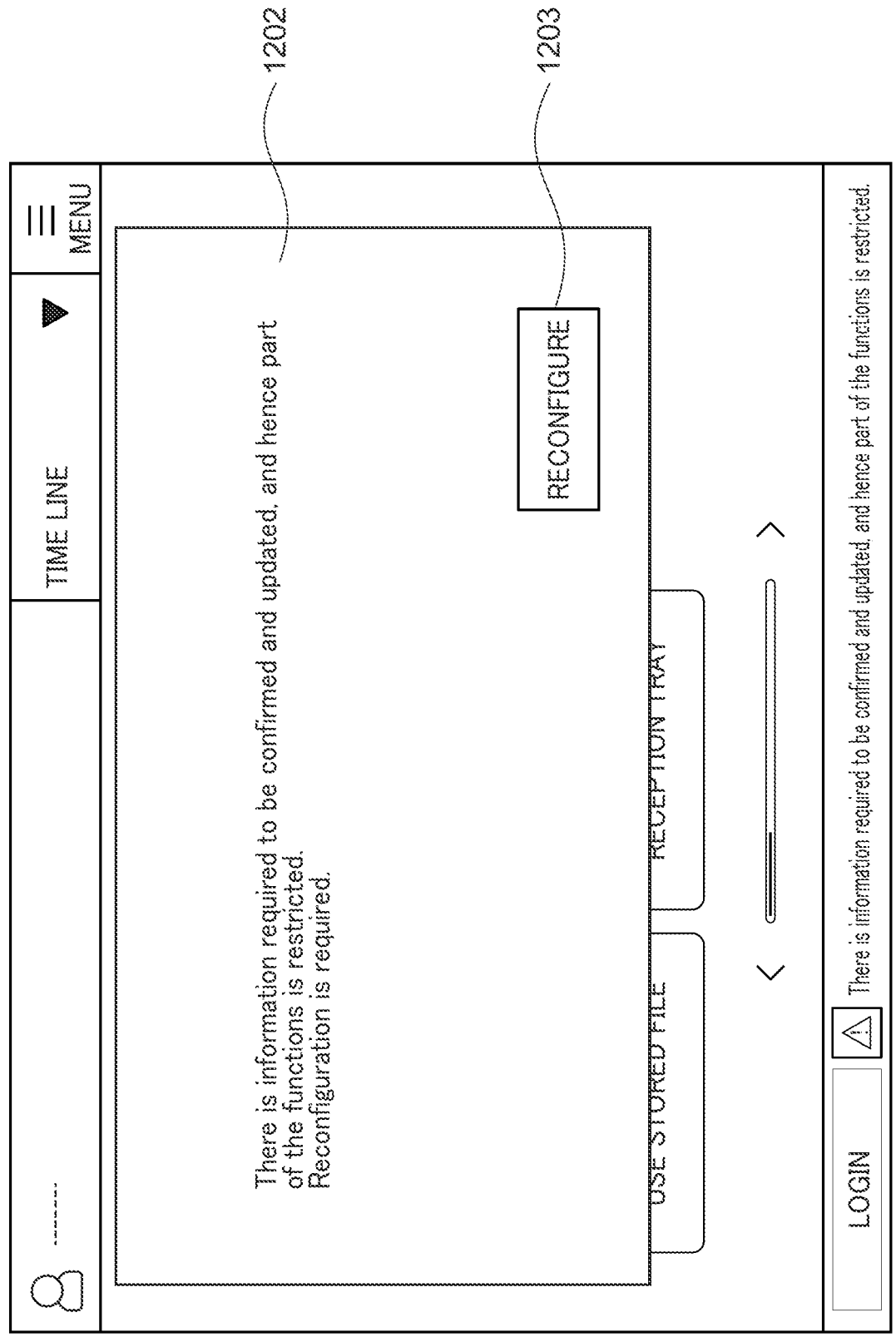
Figure 12C:
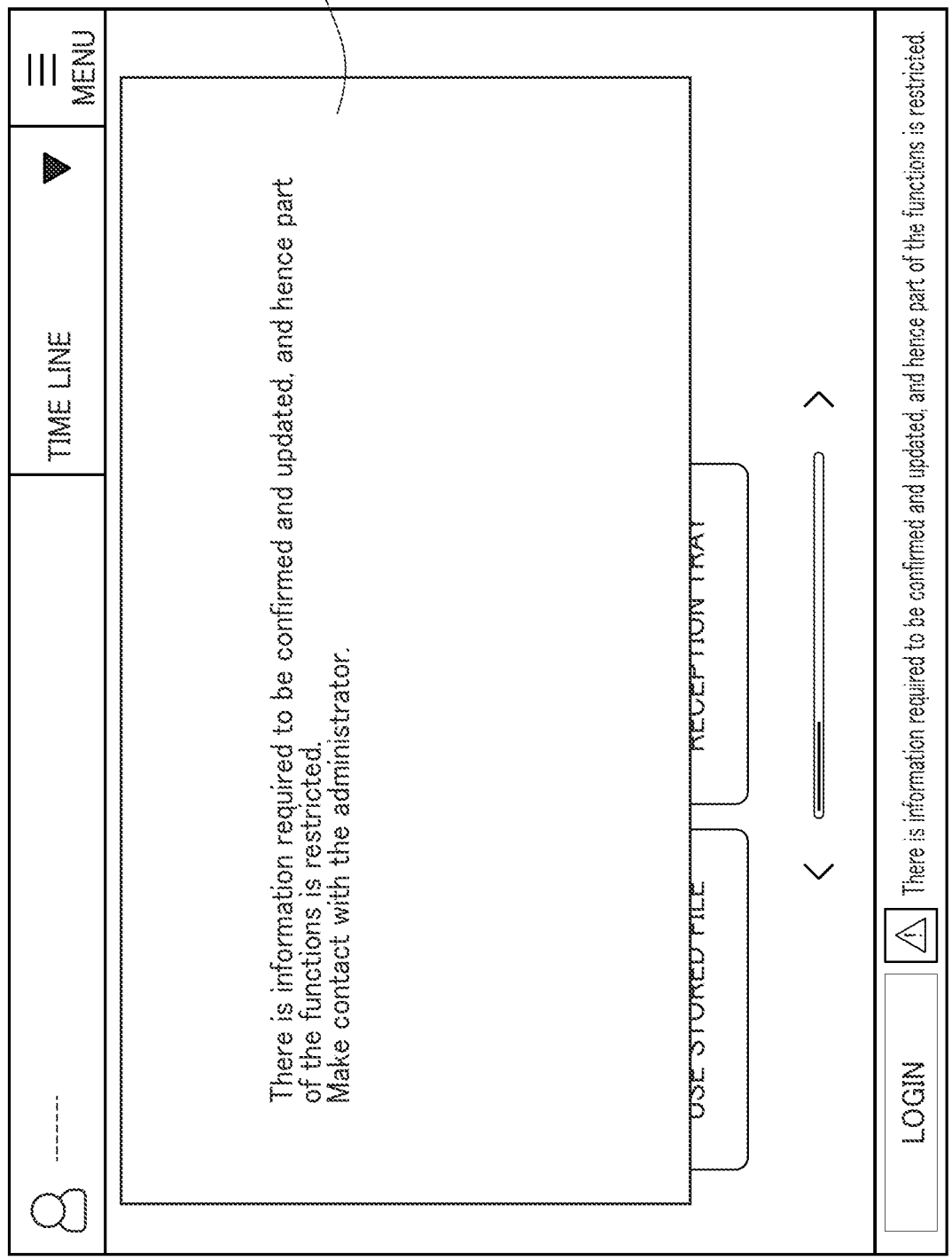

In the step S1005, the controller 100A determines that the authentication validity term has expired and restricts the print function, followed by terminating the present process. Further, the controller 100A displays one of screens shown in FIGS. 12A to 12C on the operation panel 210 in accordance with restriction of the print function. FIGS. 12A to 12C are diagrams each showing an example of a home screen (example of a message) displayed on the multifunction peripheral. FIG. 12A is an example of the home screen of the peripheral 1000, and an area (status display line) for notifying a user that part of the functions is restricted is provided at a screen bottom 1201. This enables the administrator to grasp that the print function is restricted. Thus, in a case where the authentication validity term has expired, the function is restricted regardless of a result of the comparison of the items of the installation location information. Further, at the screen bottom 1201 (notification unit), there is shown a notification "there is information required to be confirmed and updated" to the effect that the authentication validity term has expired, as the cause of restriction of the function. This enables the administrator to grasp the cause of restriction of the print function. Further, the multifunction peripheral 1000 may provide an instruction for prompting a user to make contact with the administrator to notify that the print function is restricted. Further, FIG. 12B shows an example of a pop-up message 1202 displayed when a user has logged in as the administrator. The pop-up message 1202 includes contents for notifying the administrator that part of the functions is restricted and prompting the administrator to perform reconfiguration. Note that in a case where a user has logged in as the administrator, a button 1203 for performing reconfiguration is displayed in the pop-up message 1202. Then, in a case where this button 1203 is operated, the operation panel 210 is controlled to display the device information-setting screen 801 shown in FIG. 9 and the setting screen 901 shown in FIG. 10A. Further, in a case where the counted time is at a stage where a predetermined time period remains before the expiration, the administrator may be notified that the counted time is at this stage.

Figure 13:
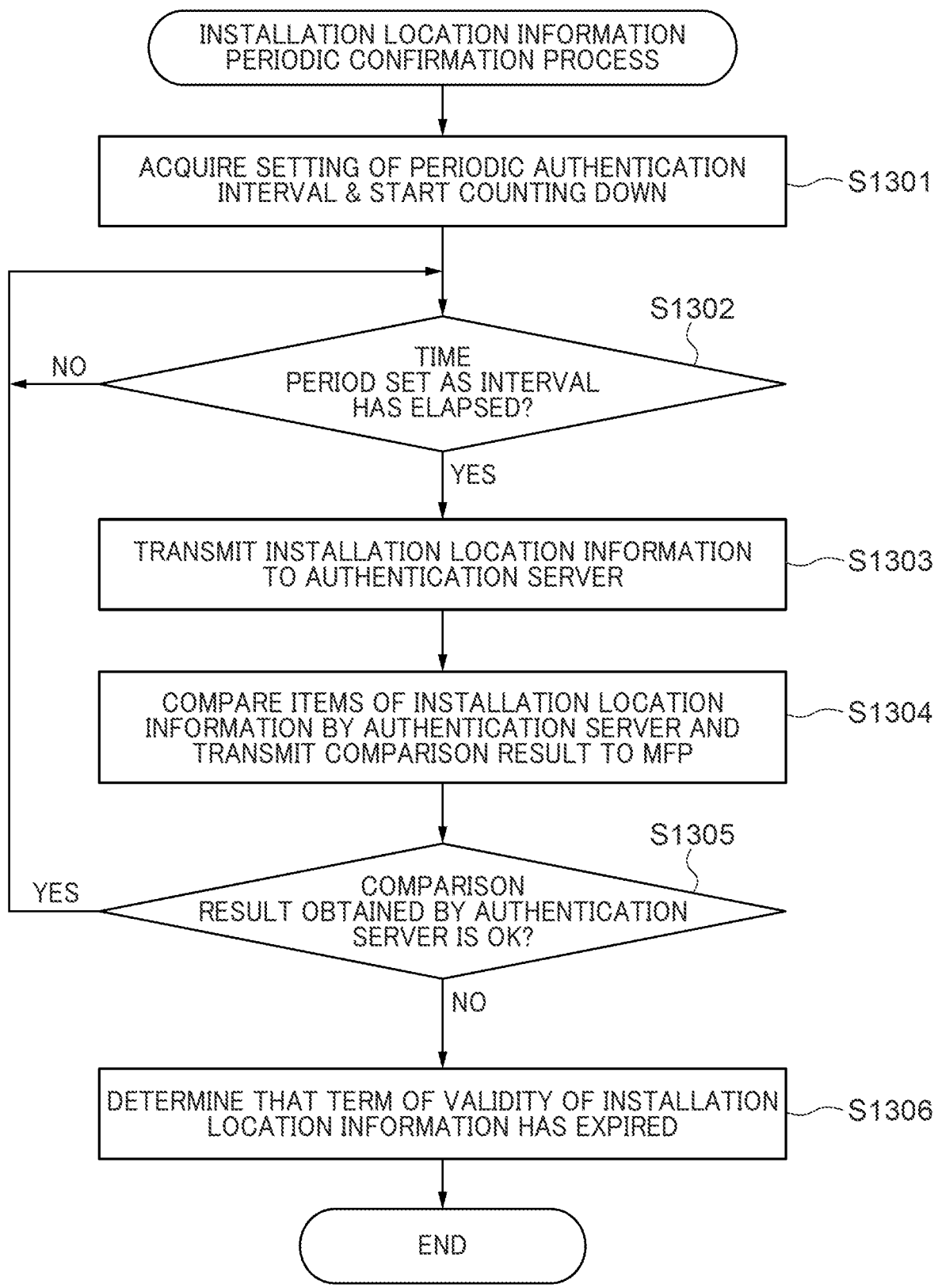
FIG. 13 is a flowchart of an installation location information periodic confirmation process.

Next, the confirmation process in the step S517, i.e. the process (installation location information periodic confirmation process) for periodically performing confirmation comparison between the installation location information of the multifunction peripheral 1000 and the installation location information registered in the authentication server 2000 will be described with reference to FIG. 13. FIG. 13 is a flowchart of the installation location information periodic confirmation process. Note that similar to the confirmation process in the step S516, this confirmation process in the step S517 as well is performed in parallel and asynchronously with login of a user, after the process is started in the multifunction peripheral 1000.

In a step S1301, the controller 100A of the multifunction peripheral 1000 acquires the setting of periodic authentication interval, which is set in the step S511, and starts counting down.

In a step S1302, the controller 100A checks a state of counting down started in the step S1301 and determines whether or not the currently set periodic authentication interval has elapsed. If it is determined in the step S1302 that the periodic authentication interval has not elapsed, i.e. it is within the periodic authentication interval, the step S1302 is repeated. On the other hand, if it is determined in the step S1302 that the periodic authentication interval has elapsed, the process proceeds to a step S1303.

In the step S1303, the controller 100A controls the network interface controller 205 of the multifunction peripheral 1000 to transmit the installation location information to the authentication server 2000 via the internal network 100.

In a step S1304, the controller 200A of the authentication server 2000 compares the current installation location information of the multifunction peripheral 1000 and the installation location information registered in the authentication server 2000 and transmits a result of the comparison to the multifunction peripheral 1000.

In a step S1305, the controller 100A determines whether or not the result of the comparison received in the step S1304 is OK. If it is determined in the step S1305 that the result of the comparison is OK, the process returns to the step S1302, and the step S1302 et seq. are sequentially executed. On the other hand, if it is determined in the step S1305 that the result of the comparison is not OK, the process proceeds to a step S1306.

In the step S1306, similar to the case where the validity of installation location information has expired, the controller 100A restricts the print function and displays one of the screens shown in FIGS. 12A to 12C on the operation panel 210, followed by terminating the present process.

Figure 14:
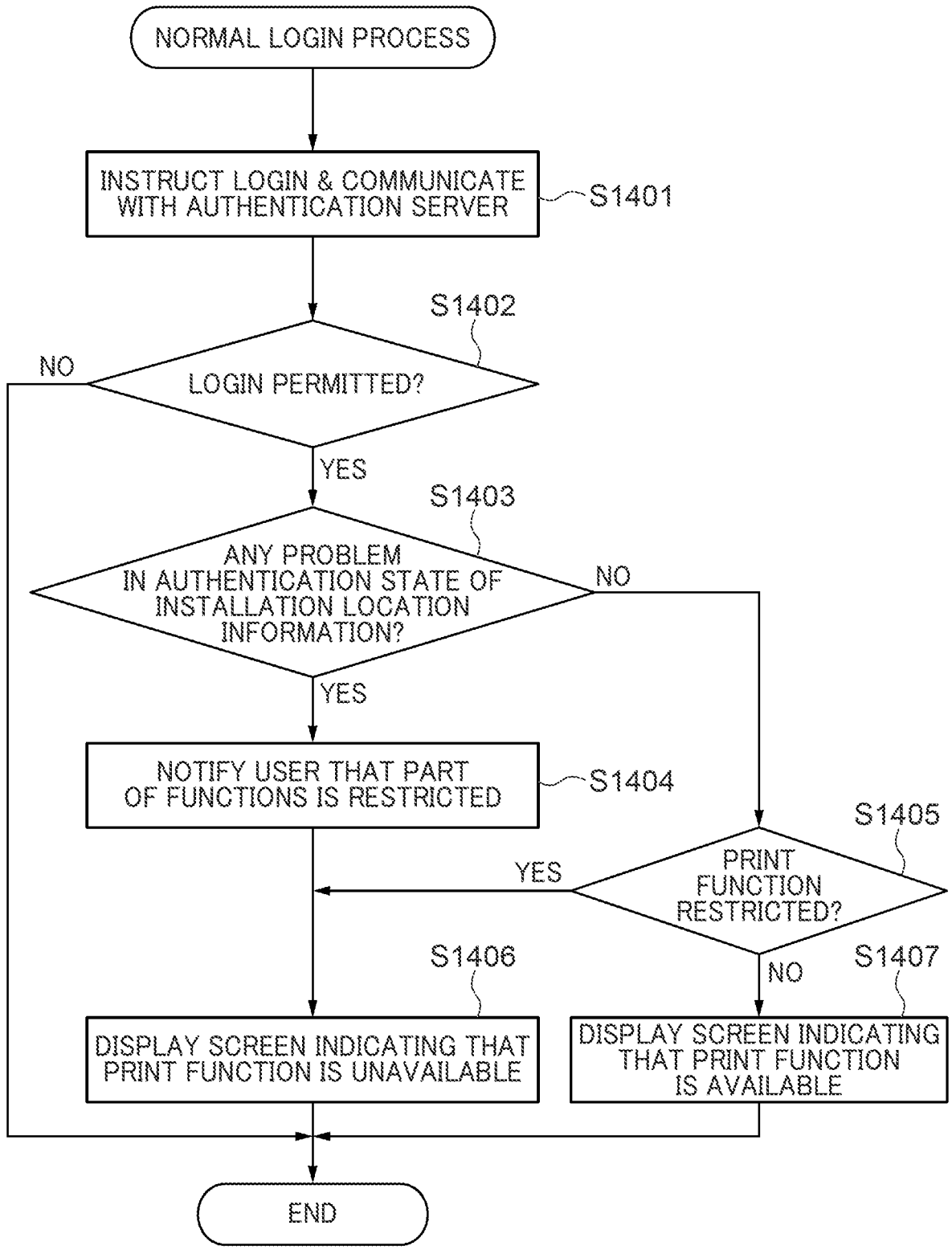
FIG. 14 is a flowchart of a process performed in a case normal login is performed.

Next, a case where normal login is performed in a state in which installation or moving of the place of the multifunction peripheral 1000 is completed and the confirmation processes described in the steps S516 and S517 are performed in parallel will be described with reference to FIG. 14. FIG. 14 is a flowchart of a process performed in the case where normal login is performed.

Referring to FIG. 14, in a step S1401, processing operations for instructing login and communicating with the authentication server 2000 are performed. The processing operations in the step S1401 are the same as the steps S502 to S508 of the flowchart in FIG. 4.

In a step S1402, the controller 100A confirms the response received from the authentication server 2000 in the step S1401 and determines whether or not to permit the login. If it is determined in the step S1402 that the login is inhibited, the present process is terminated. On the other hand, if it is determined in the step S1402 that the login is permitted, the present process proceeds to a step S1403.

In the step S1403, the controller 100A acquires results of the process for confirming the term of validity of installation location information and the installation location information periodic confirmation process which have been started in the steps S516 and S517 and separately processed in parallel. Then, the controller 100A determines, based on the results of the confirmation processes, whether or not there is any problem in the state of authentication related to the installation location information. If it is determined in the step S1403 that there is any problem in the state of authentication, the process proceeds to a step S1404. On the other hand, if it is determined in the step S1403 that there is no problem in the state of authentication, the process proceeds to a step S1405.

In the step S1404, the controller 100A displays a screen shown in FIG. 12C as a screen displayed after the login. FIG. 12C is a diagram showing an example of a pop-up message 1204 displayed when the user has logged in. The pop-up message 1204 includes contents for notifying the user that part of the functions is restricted and prompting the user to make contact with the administrator.

In a step S1406 after execution of the step S1404, the controller 100A displays the print inhibition home screen 1104 shown in FIG. 8B, in which the print function is made unavailable (restricted), as the home screen, followed by terminating the present process. This enables the administrator to grasp that the print function is disabled.

Further, in the step S1405 after execution of the step S1403, the controller 100A determines whether or not contents for restricting the print function are included in the information transmitted from the authentication server 2000. If it is determined in the step S1405 that the contents for restricting the print function are included, the process proceeds to the step S1406. On the other hand, if it is determined in the step S1405 that no contents for restricting the print function are included, the process proceeds to a step S1407.

In the step S1407, the controller 100A displays the print permission home screen 1101 shown in FIG. 8A, in which the print function is made available, as the home screen, followed by terminating the present process. This enables the administrator to grasp that the print function is enabled.

Further, in the multifunction peripheral 1000, when the installation location information is set, it is preferable that an operator who performs the setting operation can be limited to an administrator. This makes it possible to prevent the installation location information from being unnecessarily (unintentionally) rewritten, and thereby enable a user to properly use the multifunction peripheral 1000 according to the actual installation location of the multifunction peripheral 1000. Further, in a case where the term of validity of installation location information has expired, it is preferable that a notification can be provided for prompting a user to perform at least one of resetting of the term of validity and confirmation of the actual installation location information. With this, it is possible to properly cope with a case where the term of validity has expired and thereby enabling the multifunction peripheral 1000 to be used again.

The present invention has been described heretofore based on the embodiments thereof. However, the present invention is not limited to the above-described embodiments, but it can be practiced in a variety of forms, without departing from the spirit and scope thereof. Although in the present embodiment, the case where the present invention is applied to the multifunction peripheral 2001 as the image forming apparatus has been described by way of example, the present invention may be applied not only to the image forming apparatus, but also to a personal computer and the like. Further, although in the present embodiment, the case where the present invention is applied to the multifunction peripheral 2001 (MFP) as the image forming apparatus has been described by way of example, the present invention may be applied to a single function peripheral (SFP).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-085377 filed May 25, 2022, which is hereby incorporated by reference herein in its entirety.

What is claimed is:

1. An image forming apparatus that is communicable with a network and forms an image on a recording sheet, the image forming apparatus having a plurality of functions including a copy function that is performed without the network and a print function that receives data via the network and prints the data, the image forming apparatus comprising:
  one or more controllers having one or more processors and one or more memories, the one or more controllers configured to:
  display a screen including an object of the copy function and an object of the print function;
  receive input, by a user, of first installation location information of the image forming apparatus;
  make a comparison between the input first installation location information of the image forming apparatus and second installation location information stored in a server;
  permit a use of the copy function and a use of the print function, in a case where the input first installation location information coincides with the second installation location information; and
  permit a use of the copy function and restrict a use of the print function, in a case where the input first installation location information does not coincide with the second installation location information,
  wherein the one or more controllers display a message indicating that a part of the plurality of functions is restricted and a button for setting installation location information on the screen in a case where validity of the input first installation location information is expired, wherein the part of the plurality of functions that is restricted includes the print function, wherein the one or more controllers display, based on selection of the button, a setting screen for setting the installation location information, wherein an input name of the image forming apparatus, input installation location information and a set network setting are displayed on the setting screen.

2. The image forming apparatus according to claim 1, wherein the one or more controllers set a timing for making the comparison.

3. The image forming apparatus according to claim 1, wherein the one or more controllers notify, in a case where a use of the print function is restricted, the user of a restriction on the use of the print function.

4. The image forming apparatus according to claim 1, wherein the one or more controllers limit a user permitted to perform an operation for inputting the installation location information.

5. The image forming apparatus according to claim 1, wherein in a case where the validity of the input first installation location information is expired, the one or more controllers restrict a use of the print function regardless of the result of the comparison.

6. The image forming apparatus according to claim 1, wherein the one or more controller display a message prompting a user to contact to an administrator user in a case where the user different from the administrator user in a state that the validity of the input first installation location information is expired.

7. An information processing system including a server and at least one image forming apparatus that is communicable with the server via a network and forms an image on a recording sheet, the image forming apparatus having a plurality of functions including a copy function that is performed without the network and a print function that receives data via the network and prints the data, wherein the image forming apparatus comprises:
one or more controllers having one or more processors and one or more memories, the one or more controllers configured to:
display a screen including an object of the copy function and an object of the print function;
receive input, by a user, of first installation location information of the image forming apparatus;
make a comparison between the input first installation location information of the image forming apparatus and second installation location information stored in the server;
permit a use of the copy function and a use of the print function, in a case where the input first installation location information coincides with the second installation location information; and
permit a use of the copy function and restrict a use of the print function, in a case where the input first installation location information does not coincide with the second installation location information,
wherein the one or more controllers display a message indicating that a part of the plurality of functions is restricted and a button for setting installation location information on the screen in a case where validity of the input first installation location information is expired,
wherein the part of the plurality of functions that is restricted includes the print function,
wherein the one or more controllers display, based on selection of the button, a setting screen for setting the installation location information,
wherein an input name of the image forming apparatus, input installation location information and a set network setting are displayed on the setting screen.

8. A method of controlling an image forming apparatus that is communicable with a network and forms an image on a recording sheet, the image forming apparatus having a plurality of functions including a copy function that is performed without the network and a print function that receives data via the network and prints the data, the method comprising:
displaying a screen including an object of the copy function and an object of the print function;
receiving input, by a user, of first installation location information of the image forming apparatus;
making a comparison between the input first installation location information of the image forming apparatus and second installation location information stored in a server;
permitting a use of the copy function and a use of the print function, in a case where the input first installation location information coincides with the second installation location information; and
permitting a use of the copy function and restricting a use of the print function, in a case where the input first installation location information does not coincide with the second installation location information,
wherein the method further comprises:
displaying a message indicating that a part of the plurality of functions is restricted and a button for setting installation location information on the screen in a case where validity of the input first installation location information is expired;
wherein the part of the plurality of functions that is restricted includes the print function, and
displaying, based on selection of the button, a setting screen for setting the installation location information, and
wherein an input name of the image forming apparatus, input installation location information and a set network setting are displayed on the setting screen.

9. A method of controlling an information processing system including a server and at least one image forming apparatus that is communicable with the server via a network and forms an image on a recording sheet, the image forming apparatus having a plurality of functions including a copy function that is performed without the network and a print function that receives data via the network and prints the data, the method comprising:
displaying a screen including an object of the copy function and an object of the print function;
receiving input, by a user, of first installation location information of the image forming apparatus;
making a comparison between the input first installation location information of the image forming apparatus and second installation location information stored in the server;
permitting a use of the copy function and a use of the print function, in a case where the input first installation location information coincides with the second installation location information; and
permitting a use of the copy function and restricting a use of the print function, in a case where the input first installation location information does not coincide with the second installation location information, wherein the method further comprises:
displaying a message indicating that a part of the plurality of functions is restricted and a button for setting installation location information on the screen in a case where validity of the input first installation location information is expired,
wherein the part of the plurality of functions that is restricted includes the print function, and
displaying, based on selection of the button, a setting screen for setting the installation location information, and
wherein an input name of the image forming apparatus, input installation location information and a set network setting are displayed on the setting screen.

10. A non-transitory computer-readable storage medium storing a program for causing a computer to execute a method of controlling an image forming apparatus that is communicable with a network and forms an image on a recording sheet, the image forming apparatus having a plurality of functions including a copy function that is performed without the network and a print function that receives data via the network and prints the data,
wherein the method comprises:
displaying a screen including an object of the copy function and an object of the print function;
receiving input, by a user, of first installation location information of the image forming apparatus;
making a comparison between the input first installation location information of the image forming apparatus and second installation location information stored in a server;
permitting a use of the copy function and a use of the print function, in a case where the input first installation location information coincides with the second installation location information; and
permitting a use of the copy function and restricting a use of the print function, in a case where the input first installation location information does not coincide with the second installation location information,
wherein the method further comprises:
displaying a message indicating that a part of the plurality of functions is restricted and a button for setting installation location information on the screen in a case where validity of the input first installation location information is expired,
wherein the part of the plurality of functions that is restricted includes the print function, and
displaying, based on selection of the button, a setting screen for setting the installation location information, and
wherein an input name of the image forming apparatus, input installation location information and a set network setting are displayed on the setting screen.

11. A non-transitory computer-readable storage medium storing a program for causing a computer to execute a method of controlling an information processing system including a server and at least one image forming apparatus that is communicable with the server via a network and forms an image on a recording sheet, the image forming apparatus having a plurality of functions including a copy function that is performed without the network and a print function that receives data via the network and prints the data,
wherein the method comprises:
displaying a screen including an object of the copy function and an object of the print function;
receiving input, by a user, of first installation location information of the image forming apparatus;
making a comparison between the input first installation location information of the image forming apparatus and second installation location information stored in the server;
permitting a use of the copy function and a use of the print function, in a case where the input first installation location information coincides with the second installation location information; and
permitting a use of the copy function and restricting a use of the print function, in a case where the input first installation location information does not coincide with the second installation location information,
wherein the method further comprises:
displaying a message indicating that a part of the plurality of functions is restricted and a button for setting installation location information on the screen in a case where validity of the input first installation location information is expired,
wherein the part of the plurality of functions that is restricted includes the print function, and
displaying, based on selection of the button, a setting screen for setting the installation location information, and
wherein an input name of the image forming apparatus, input installation location information and a set network setting are displayed on the setting screen.

* * * * *